(12) United States Patent
Sasaki et al.

(10) Patent No.: US 7,067,066 B2
(45) Date of Patent: *Jun. 27, 2006

(54) METHOD OF MANUFACTURING THIN FILM MAGNETIC HEAD

(75) Inventors: Yoshitaka Sasaki, Tokyo (JP); Atsushi Iijima, Tokyo (JP); Seiji Yari, Tokyo (JP); Katsuya Kanakubo, Tokyo (JP)

(73) Assignee: TDK Corporation, Tokyo (JP)

( * ) Notice: Subject to any disclaimer, the term of this patent is extended or adjusted under 35 U.S.C. 154(b) by 247 days.

This patent is subject to a terminal disclaimer.

(21) Appl. No.: 10/678,312

(22) Filed: Oct. 6, 2003

(65) Prior Publication Data

US 2004/0069741 A1    Apr. 15, 2004

Related U.S. Application Data

(63) Continuation of application No. 09/765,293, filed on Jan. 22, 2001, now Pat. No. 6,669,855.

(30) Foreign Application Priority Data

Jan. 25, 2000    (JP) ............................... 2000-18071

(51) Int. Cl.
*B44C 1/22*    (2006.01)
*G11B 5/127*    (2006.01)

(52) U.S. Cl. .......................... 216/22; 216/41; 216/67; 29/603.13; 29/603.15; 360/113

(58) Field of Classification Search ................ 216/22, 216/41, 67; 29/603.13, 603.15; 360/113
See application file for complete search history.

(56) References Cited

U.S. PATENT DOCUMENTS

| 5,600,519 A | 2/1997 | Heim et al. |
| 5,607,599 A | 3/1997 | Ichihara et al. |
| 5,938,941 A * | 8/1999 | Ishiwata et al. ............... 216/22 |
| 5,946,167 A | 8/1999 | Hara et al. |
| 5,966,277 A | 10/1999 | Koshikawa et al. |
| 6,419,845 B1 | 7/2002 | Sasaki |
| 6,854,175 B1 * | 2/2005 | Sasaki ..................... 29/603.15 |

FOREIGN PATENT DOCUMENTS

| JP | 60037130 A | 2/1985 |
| JP | 06044528 A | 2/1994 |

(Continued)

*Primary Examiner*—Shamim Ahmed
(74) *Attorney, Agent, or Firm*—Oliff & Berridge, PLC

(57) ABSTRACT

A method of manufacturing a thin-film magnetic head allowing dimension control of the width of the magnetic pole and reduction of the time required for formation is provided. A layer of iron nitride formed by sputtering is selectively etched with the RIE to form a top pole tip. In this etching process with RIE, chlorine-type gas is selected as a gas seed for etching, and the process temperature is in a range of 50° C. to 300° C. Subsequently, using part of a first mask and a tip portion of the top pole tip as a mask, part of both the write gap layer and the second bottom pole are etched with the RIE similarly to the above process, to thereby form a magnetic pole. The etching conditions are optimized by performing the process with the RIE under the above conditions, so that both of the top pole tip and the magnetic pole can be formed with high precision, and that the time required for forming both of these elements can be significantly reduced.

14 Claims, 25 Drawing Sheets

FOREIGN PATENT DOCUMENTS

| | | |
|---|---|---|
| JP | 8-249614 | 9/1996 |
| JP | 08269748 A | 10/1996 |
| JP | 11-7608 | 1/1999 |
| JP | 11-339223 | 12/1999 |
| JP | 11339223 A | 12/1999 |

* cited by examiner

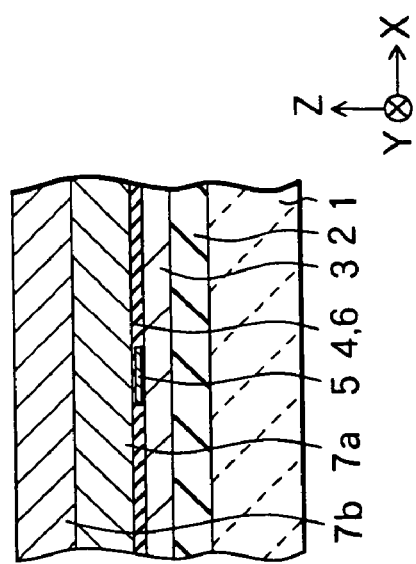
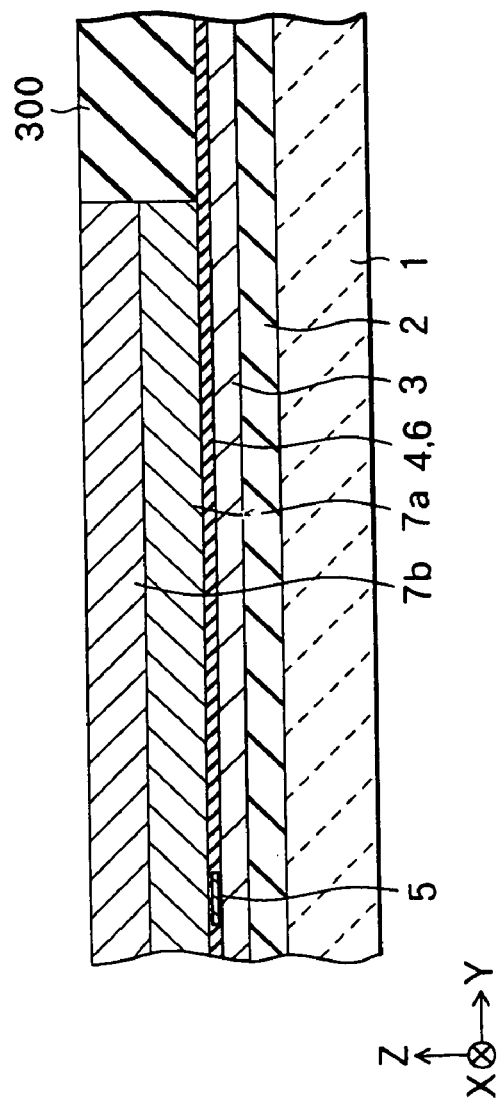
FIG.1A
FIG.1B

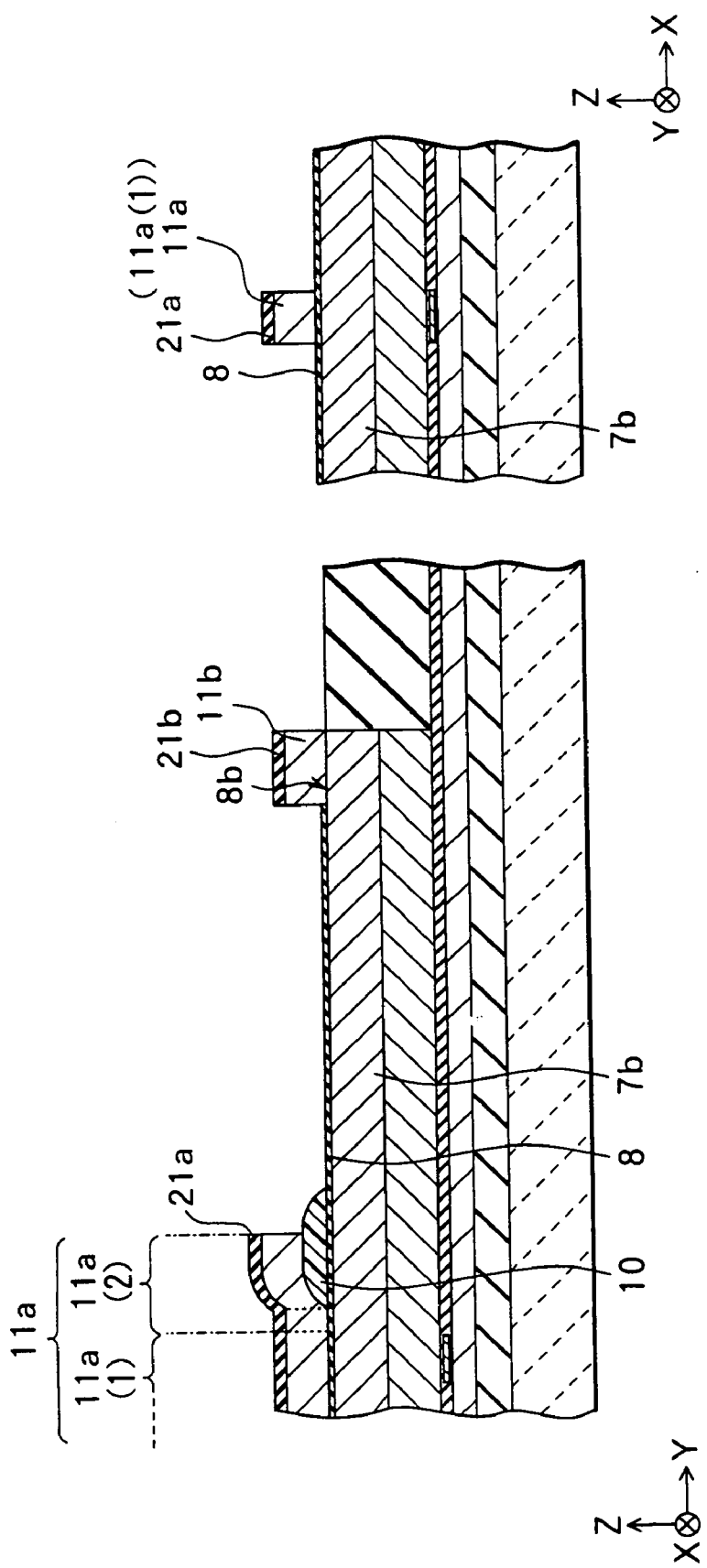

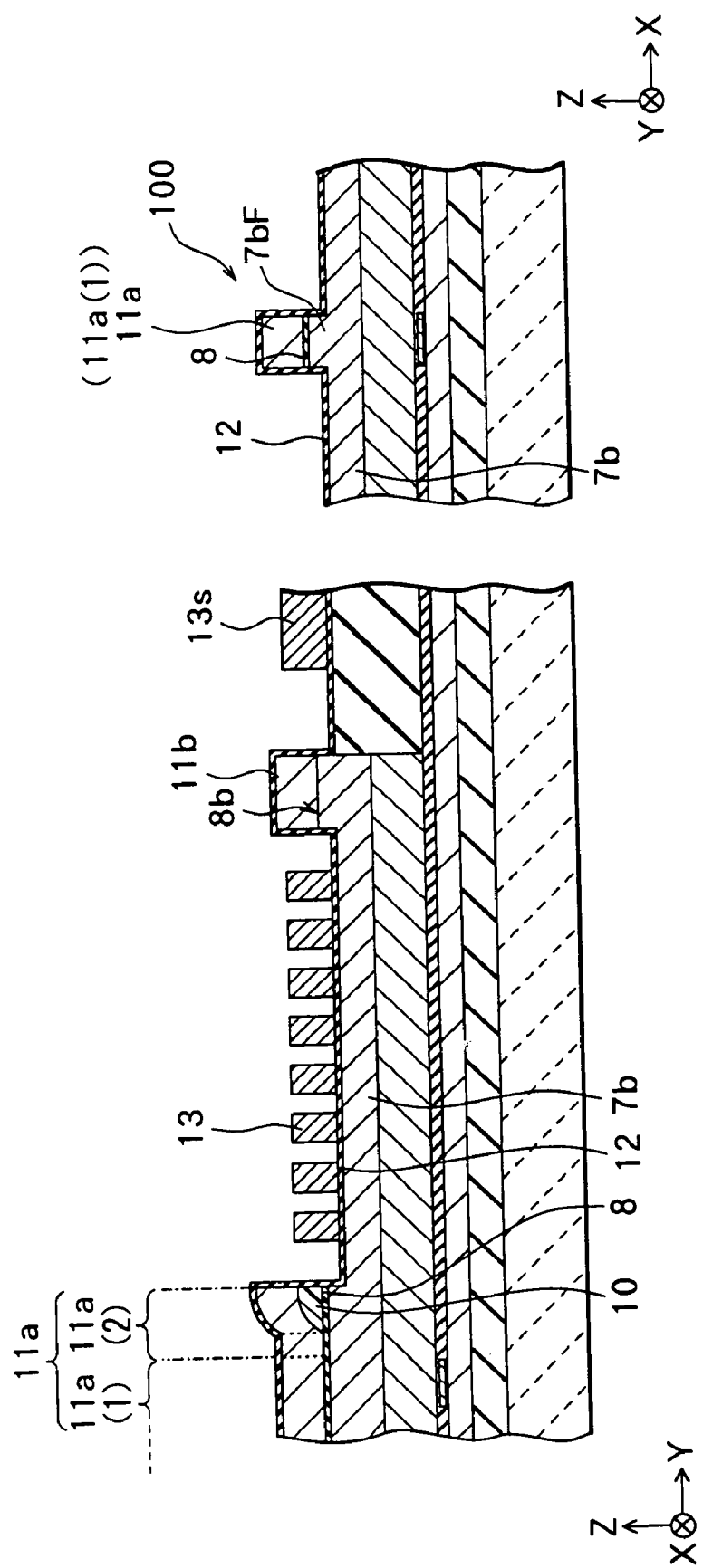

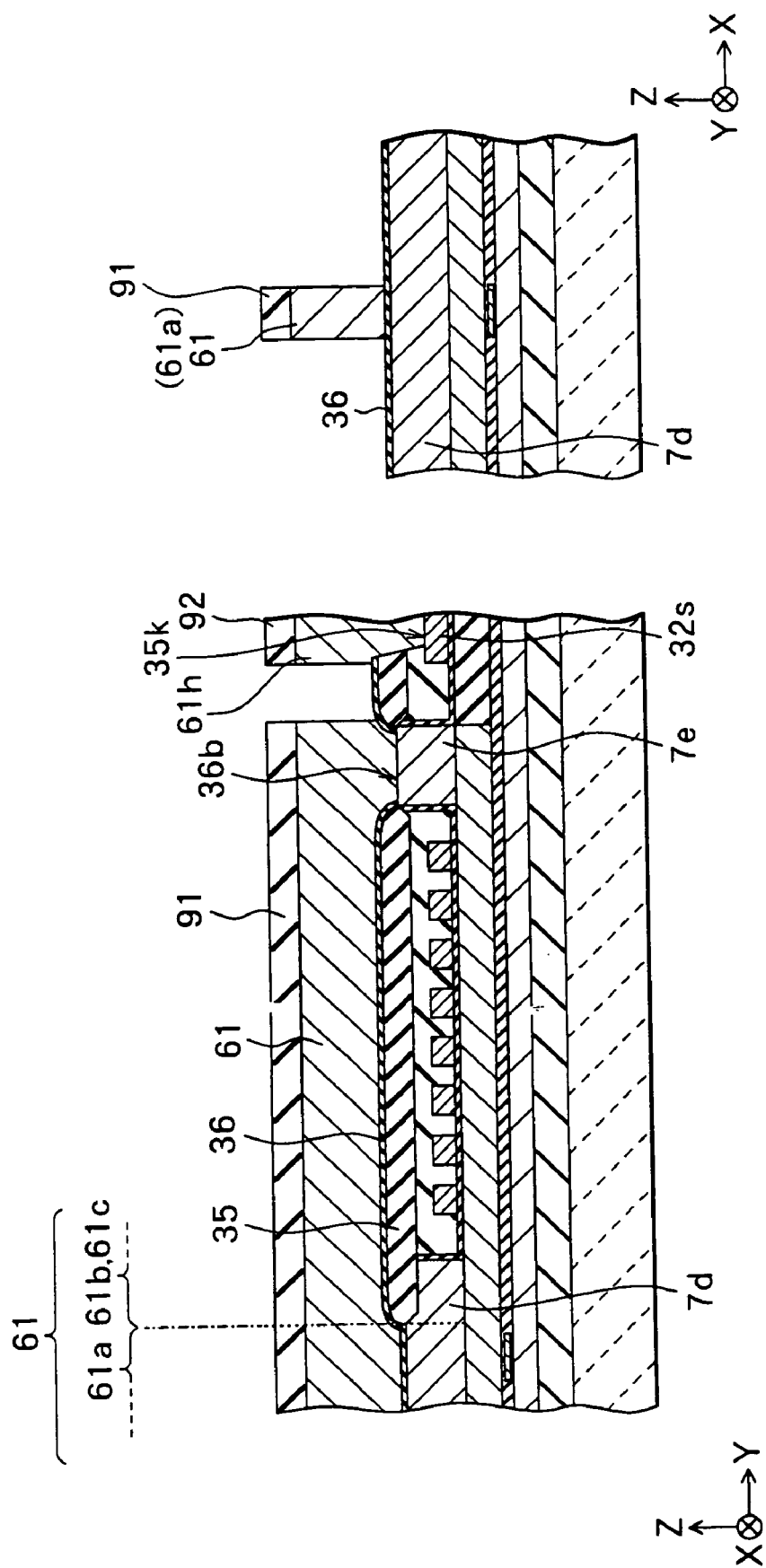

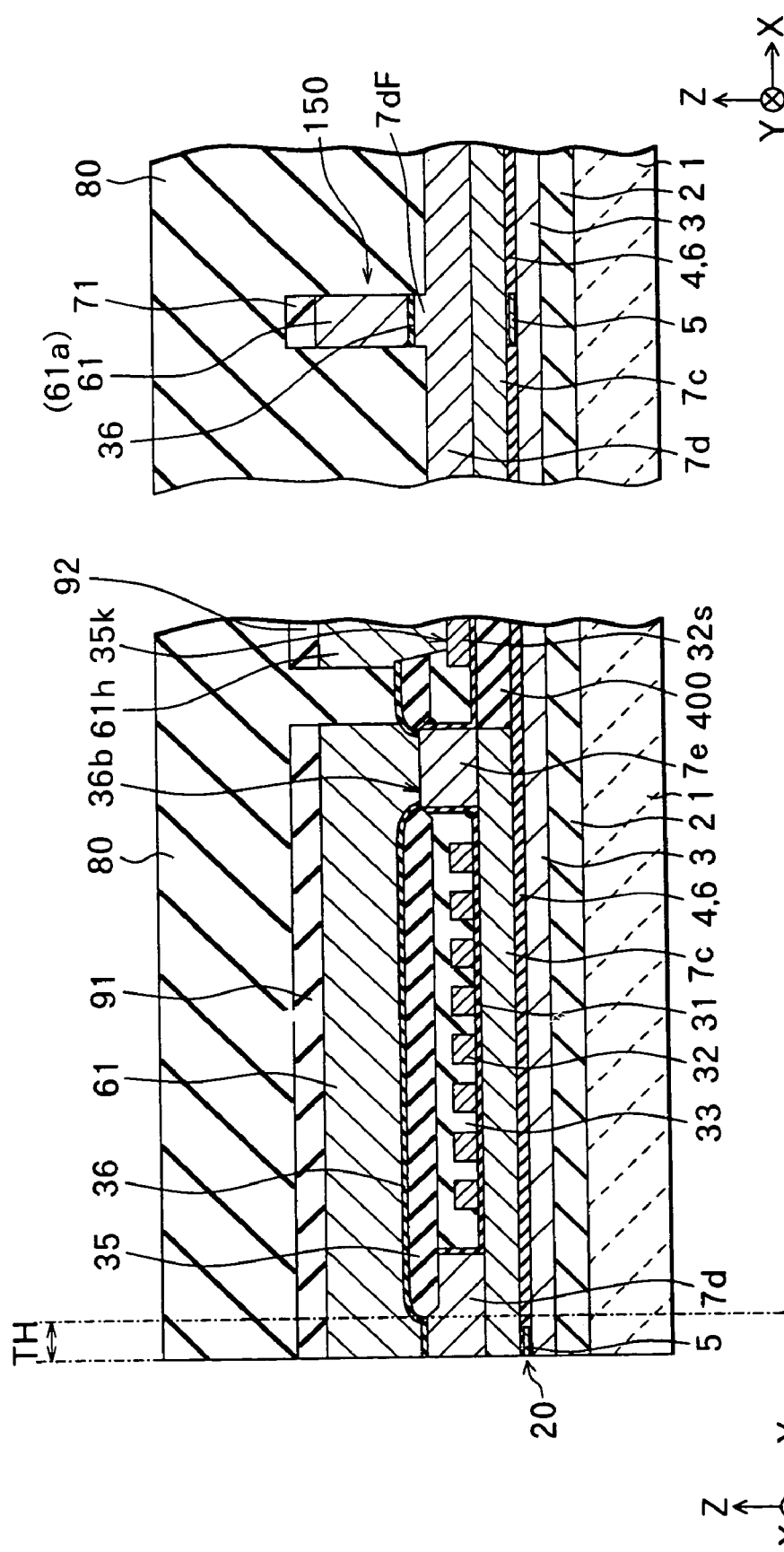

METHOD OF MANUFACTURING THIN FILM MAGNETIC HEAD

This is a Continuation of U.S. patent application Ser. No. 09/765,293 filed on Jan. 22, 2001, now issued as U.S. Pat. No. 6,669,855, the contents of which are incorporated herein in its entirety.

BACKGROUND OF THE INVENTION

1. Field of the Invention

The present invention relates to a method of manufacturing a thin-film magnetic head having at least an inductive-type magnetic transducer for writing.

2. Description of the Related Art

Improvements in the performance of a thin-film magnetic head have been sought since a surface recording density of a hard disk drive has been improved. A composite thin-film magnetic head having a structure in which, a recording head having an inductive-type magnetic transducer for writing and a reproducing head having a magnetoresistive (hereinafter referred to as MR) element for reading are stacked, is widely used as the thin-film magnetic head. The MR element includes an AMR element using an anisotropic magnetoresistive (hereinafter referred to as AMR) effect and a GMR element using a giant magneto resistive (hereinafter referred to as GMR) effect. The reproducing head using the AMR element is called an AMR head or simply an MR head, and the reproducing head using the GMR element is called a GMR head. The AMR head is used as a reproducing head whose surface recording density is over 1 gigabit per square inch, and the GMR head is used as the reproducing head whose surface recording density is over 3 gigabit per square inch.

The AMR head comprises an AMR film having the AMR effect. The GMR head has a structure identical to the AMR head except that a GMR film having the GMR effect is used in place of the AMR film. However, when the same external magnetic field is applied, the GMR film exhibits greater change in resistance than the AMR film. As a result, the GMR head can increase the reproduction output in the order of three to five times the AMR head.

In order to improve the performance of the reproducing head, a method of replacing the AMR film with a material having better magnetoresistive sensitivity such as the GMR film as the MR film, a method of making an appropriate pattern width of the MR film, especially the MR height and other methods are employed. The MR height is a distance between an end of the MR element on the air bearing surface side to an end thereof on the other side, and it is controlled by a polishing amount in processing the air bearing surface. The air bearing surface, here, is a surface of the thin film magnetic head facing a magnetic recording medium, and is called a track surface as well.

On the other hand, improvements in performance of a recording head have been desired while performance in a reproducing head has improved. A factor which determines the performance of the recording head is a throat height. The throat height is a length of a pole between the air bearing surface and an edge of an insulating layer which electrically separates a thin-film coil for generating magnetic flux. The throat height is desired to be optimized in order to improve the performance of the recording head. The throat height is controlled by a polishing amount in processing the air bearing surface.

To improve a recording density among the performance of the recording head, a track density of the magnetic recording medium needs to be increased. In order to achieve such an increase, a recording head with a narrow track structure needs to be realized in which a width of the top and bottom poles on the air bearing surface, which are formed on top and bottom sandwiching a write gap, is reduced from the order of some microns to sub-microns. Semiconductor process techniques are employed to achieve the narrow track structure.

A method of manufacturing the composite thin-film magnetic head as an example of the methods of manufacturing the thin-film magnetic head of the related art will be described by referring to FIG. 27 through FIG. 32.

As shown in FIG. 27, in this manufacturing method, an insulating layer 102 made of, for example, aluminum oxide ($Al_2O_3$; hereinafter referred to simply as "alumina") of about 5 µm to 10 µm in thickness is deposited on a substrate 101 made of, for example, altic (aluminum oxide and titanium carbide; $Al_2O_3$.TiC). A bottom shield layer 103 for a reproducing head is formed on the insulating layer 102. A shield gap film 104 is formed on the bottom shield layer 103 by, for example, sputter-depositing alumina with 100 nm to 200 nm in thickness. An MR film 105 of tens of nanometers in thickness for making up the MR element for reproduction is formed on the shield gap film 104, and patterned in a desired shape through photolithography with high precision. Next, after forming lead layers (not shown) on both sides of the MR film 105 as an extraction electrode layer which is electrically connected to the MR film 105, a shield gap film 106 is formed on the lead layer, the shield gap film 104 and the MR film 105, and then the MR film 105 is buried in the shield gap films 104 and 106. Further, a top shield-cum-bottom pole (hereinafter referred to simply as a bottom pole) 107 made of magnetic materials, such as ferronickel (NiFe; hereinafter referred to simply as "permalloy" (trade name)) used for both reproduction and recording heads is formed on the shield gap film 106.

As shown in FIG. 28, a write gap layer 108 made of an insulating material, such as alumina, is formed on the bottom pole 107, and a photoresist film 109 in a desired pattern is formed on the write gap layer 108 through photolithography with high precision. Next, a thin-film coil 110 for an inductive-type recording head made of, for example, copper (Cu) is formed on the photoresist film 109 by, for example, plating. A photoresist film 111 in a desired pattern is formed covering the photoresist film 109 and the thin-film coil 110 through photolithography with high precision. Next, the photoresist film 111 is subjected to a heat treatment at a temperature of, for example, 250° C. to have turns of the coil 110 insulated from each other.

As shown in FIG. 29, an opening 108a is formed by partially etching the write gap layer 108 in a position behind the coil 110 (right-hand side in FIG. 29) to expose part of the bottom pole 107 in order to form a magnetic path. A film of a magnetic material with a high saturation magnetic flux density, such as permalloy, is formed by an electrolytic plating, covering the exposed surface of the bottom pole 107, and the photoresist film 111 and the write gap layer 108. The plated film formed of permalloy is selectively etched by ion milling using a mask (not shown) formed of a photoresist film having a prescribed planar shape, to thereby form a top yoke-cum-top pole (hereinafter referred to as a top pole) 112. The top pole 112 has, for example, such a planar shape as shown in FIG. 32, which will be described hereinafter, and includes a yoke 112a and a pole tip 112b. The top pole 112 has a contact with the bottom pole 107 in the opening 108a being magnetically coupled. Next, after both the write gap layer 108 and the bottom pole 107 are partially etched about 0.5 μm by ion milling using part of the top pole 112 (the pole tip 112b) as a mask (see FIG. 31), an overcoat layer 113 is formed of a material, such as alumina, on the top pole 112. The thin-film magnetic head is completed after a track surface, that is, air bearing surface 120 of the recording head and reproducing head is formed by machining or polishing.

FIG. 30 through FIG. 32 show a completed configuration of the thin-film magnetic head. FIG. 30 shows a cross-sectional view of the thin-film magnetic head orthogonal to the air bearing surface 120, FIG. 31 is an enlarged cross-sectional view of the pole in parallel to the air bearing surface 120, and FIG. 32 is a plan view. FIG. 29 is a cross sectional view taken along the line XXIX—XXIX in FIG. 32. Illustrations of the overcoat layer 113 and the like are omitted in FIG. 30 to FIG. 32. The thin-film coil 110 shown in FIG. 32 is only the outermost periphery portion thereof, and the photoresist film 111 shown therein is only the outermost end thereof.

In FIG. 30 and FIG. 32, "TH" stands for throat height, and "MR-H" stands for MR height. In both of these figures, "TH0 position" is the position of the end of the photoresist layer 111, which serves as an insulating layer for electrically insulating the thin-film coil 110, located nearest to the air bearing surface 120. This is the reference position in defining a throat height, that is, a throat height zero position. Meanwhile, "MRH0 position" is the position of the end of the MR film 105 which is farthest from the air bearing surface 120, i.e. an MR height zero position.

Other than the throat height (TH) and the MR height (MR-H), one of the factors that determine the performance of the thin-film magnetic head is an apex angle (θ) shown in FIG. 30. The apex angle θ is the average tilt angle of the slope of the photoresist film 111 located on the side closer to the air bearing surface 120.

As shown in FIG. 31, a structure in which the write gap layer 108 and the bottom pole 107 are both partially etched in a self-aligned manner to the pole tip 112b of the top pole 112 is called a trim structure. The trim structure prevents an increase in the effective track width, which would otherwise be occurred through expansion of the magnetic flux generated during writing of a narrow track. In FIG. 31, "P2W" represents a width of the portion with the trim structure (hereinafter referred to simply as a "pole tip 200"), that is, a pole width or a "track width". In the same figure, "P2L" represents the thickness of the pole tip 112b forming part of the pole tip 200, that is, the length of the pole. As shown in FIG. 31, lead layers 121 as an extraction electrode layer being electrically connected to the MR film 105 is provided on both sides of the MR film 105. However, an illustration of the lead layers 121 is omitted in FIG. 27 to FIG. 30.

As shown in FIG. 32, the top pole 112 is composed mostly of the yoke 112a. The top pole 112 includes the pole tip 112b having an almost uniform width as the pole width P2W as well. At a coupling portion of the yoke 112a and the pole tip 112b, an outer periphery of the yoke 112a has an angle α against a surface parallel to the air bearing surface 120. At the above coupling portion, an outer periphery of the pole tip 112b has an angle β against the surface parallel to the air bearing surface. Here, α is, for example, about 45 degrees, and β is 90 degrees. As described above, the pole tip 112b serves as a mask for forming the trim structure of the pole tip 200. As can be seen from FIG. 30, the pole tip 112b extends over the flat write gap layer 108, while the yoke 112a extends over a coil portion (hereinafter referred to as an "apex portion") covered with the photoresist film 111 and raised like a hill.

The characteristics of the structure of the top pole is disclosed in detail in, for example, Unexamined Patent Application Publication No. Hei 8-249614. This publication discloses a top pole with a structure where the width of the portion located behind the TH0 position (the side farther away from the air bearing surface 120) is gradually widened.

As the pole width P2W of the pole tip 200 defines the recording track width on a recording medium, it is required that the pole tip 200 is formed with high precision and that the pole width P2W is reduced in order to increase recording density. If the pole width P2W is too great in value, a phenomenon in which data is written also to the area adjacent to a predetermined recording track area on the recording medium, that is, a side erase phenomenon, occurs, thereby preventing improvement in recording density. Therefore, it is important to simultaneously reduce the pole width P2W of the pole tip 200 and have such a pole width P2W that is constant throughout the thickness direction (vertical direction in FIG. 31) and the length direction (horizontal direction in FIG. 30).

The top pole 112 can be formed by a wet process, such as a frame plating, or by a dry process in which a plated film formed of, for example, permalloy is selectively etched and patterned by ion milling, as described above.

However, the applicants have confirmed that the ion milling brings about the following problems. For example, when ion beam is irradiated from a direction substantially perpendicular to the surface of the plated film (a direction at an angle of 0 degree to 30 degrees to the perpendicular line to the surface of the plated film), the etching product generated in etching is reattached to the unetched portion, whereby the width of the pole tip 112 is partially increased from the designed value. On the other hand, when, for example, ion beam irradiation is performed from a direction substantially parallel to the surface of the plated film (a direction at an angle of 50 degrees to 70 to the perpendicular line to the surface of the plated film), the above-described reattachment of the etching product can be prevented. However, the etching amount is increased as the process proceeds, leading to partial decrease in width of the pole tip 112b from the designed value. When the pole tip 200 is formed by ion milling under the latter conditions above in particular, the pole width P2W will be inconstant as shown in FIG. 33.

In the related art method, since the photoresist pattern obtained by selectively exposing to light the photoresist film formed on the plated film is used as a mask for patterning the plated film of permalloy. This deteriorates precision in forming the mask due to adverse effects of the light reflected from the surface of the underlying permalloy layer having a high reflectance.

Further, according to the method of the related art, the pole tip 200 is formed by ion milling with a lower etching rate, and therefore etching process takes a long time, requiring a considerable time to finish processing of the pole tip 200. Such a tendency is not limited to formation of the pole tip 200, but the same applies to formation of the top pole 112 and other magnetic layers (such as the bottom shield layer 103, the bottom pole 107, and the like).

SUMMARY OF THE INVENTION

The present invention has been conceived in view of the above-described problems. It is an object of the invention to provide a method of manufacturing a thin-film magnetic head that enables formation of the thin-film magnetic head with high precision and in a short time.

The present invention provides a method of manufacturing a thin-film magnetic head which comprises first and second magnetic layers each including a magnetic pole and magnetically coupled to each other, the magnetic poles facing each other with a gap layer in between and being to be faces with a recording medium, and a thin-film coil portion disposed between the two magnetic layers with an insulating film in between. The first magnetic layer includes a first magnetic layer portion having a first uniform width portion that defines a track width, and a second magnetic layer portion extending a region where the thin-film coil portion is disposed and magnetically coupled to the first magnetic layer portion. The second magnetic layer includes a second uniform width portion corresponding to the first uniform width portion of the first magnetic layer. In this method of manufacturing a thin-film magnetic head of the invention, at least one of the step of forming the first magnetic layer and the step of forming the second magnetic layer includes the steps of forming a magnetic material layer, and selectively etching the magnetic material layer by reactive ion etching.

According to the method of manufacturing a thin-film magnetic head of the invention, the magnetic material layer is selectively etched and patterned by reactive ion etching, whereby at least one of the first and second magnetic layers is formed. Since the speed of etching process is generally faster with the reactive ion etching than the ion milling, at least one of the first and second magnetic layers can be formed in a short time.

In the method of manufacturing a thin-film magnetic head of the invention, a first mask formed of a predetermined inorganic material may be used in the step of selective etching. In such a case, preferably a material for forming the first mask contains aluminum oxide or aluminum nitride.

Further, in the method of manufacturing a thin-film magnetic head of the invention, the step of forming the first mask may include the steps of forming a mask precursor layer made of an inorganic material on a surface of a magnetic material layer, forming a second mask on a surface of the mask precursor layer, and forming the first mask by patterning the mask precursor layer with use of the second mask. In such a case, the first mask is preferably formed by reactive ion etching.

Further, in the method of manufacturing a thin-film magnetic head of the invention, a photoresist film pattern having a predetermined shape may be formed on the surface of the mask precursor layer and used as the second mask, or a metal film pattern having a predetermined shape may be formed on the surface of the mask precursor layer and used as the second mask. When the metal film pattern is used as the second mask, the metal film pattern may be formed by selectively plating on the surface of the mask precursor layer, or the metal film pattern may be formed by forming a metal layer on the surface of the mask precursor layer and selectively etching the metal layer.

Further, in the method of manufacturing a thin-film magnetic head of the invention, at least the first uniform width portion of the first magnetic layer may be formed by the step of selective etching, or, at least the second uniform width portion of the second magnetic layer may be formed by the step of selective etching.

Further, in the method of manufacturing a thin-film magnetic head of the invention, the gap layer excluding a portion corresponding to the first uniform width portion of the first magnetic layer may be selectively removed by reactive ion etching. In such a case, formation of the first uniform width portion of the first magnetic layer, the above selective removal of the gap layer, and formation of the second uniform width portion of the second magnetic layer are preferably achieved successively. In addition, in processing the above portions, preferably, the first uniform width portion of the first magnetic layer is formed by using the first mask made of an inorganic material, and the selective removal of the gap layer and the formation of the second uniform width portion of the second magnetic layer are achieved by using as a mask at least one of the first mask and the first uniform width portion.

Further, in the method of manufacturing a thin-film magnetic head of the invention, in the step of forming the first magnetic layer, the second magnetic layer portion may be formed separately from the first magnetic layer portion by reactive ion etching.

Further, in the method of manufacturing a thin-film magnetic head of the invention, when the thin-film magnetic head further includes a magnetic transducer film extending in a direction away from a recording-medium-facing surface to be faced with the recording medium and a third magnetic layer magnetically shielding the magnetic transducer film, the third magnetic layer may be formed by reactive ion etching.

Further, in the method of manufacturing a thin-film magnetic head of the invention, the magnetic layer may be formed by sputtering using a predetermined magnetic material. In such a case, preferably, the magnetic material contains iron nitride or an amorphous alloy, such as a material containing zirconium-cobalt-iron.

Further, in the method of manufacturing a thin-film magnetic head of the invention, the step of selective etching is preferably performed in a gas atmosphere containing at least one of chlorine, boron dichloride, boron trichloride, and hydrogen chloride, and at a temperature in a range of 50° C. to 300° C.

The present invention provides a method of manufacturing a thin-film magnetic head which includes first and second magnetic layers each including a magnetic pole and magnetically coupled to each other, the magnetic poles facing each other with a gap layer in between and being to be faced with a recording medium, and a thin-film coil portion disposed between the two magnetic layers with an insulating film in between. The first magnetic layer includes a first magnetic layer portion having a first uniform width portion that defines a track width, and a second magnetic layer portion extending a region where the thin-film coil portion is disposed and magnetically coupled to the first magnetic layer portion. The second magnetic layer includes a second uniform width portion corresponding to the first uniform width portion of the first magnetic layer. This method of manufacturing a thin-film magnetic head includes a first etching step of selectively etching at least one of the first magnetic layer, the gap layer, and the second magnetic layer by reactive ion etching, and a second etching step of selectively etching at least one of the first magnetic layer, the gap layer, and the second magnetic layer by focused ion beam etching. The second etching step is performed after the first etching step, to thereby achieve formation of the first uniform width portion of the first magnetic layer, selective removal of the gap layer excluding a portion corresponding to the first uniform width portion, and formation of the second uniform width portion of the second magnetic layer.

According to the method of manufacturing a thin-film head of the invention, the first etching process is performed with reactive ion etching, and then the second etching process is performed with focused ion beam etching, so that a magnetic pole tip composed of the first uniform width portion, a portion of the gap layer corresponding to the first uniform width portion and the second uniform width portion is formed. Since etching process with the focused ion beam etching enables processing with higher precision than the etching process with reactive ion etching, the width of the magnetic pole can be reduced with high precision by forming the magnetic pole through both the first and second etching processes as compared with the case where only the first etching process is performed.

Further, in the method of manufacturing a thin-film magnetic head of the invention, in the second etching step, both the gap layer and the second magnetic layer may be partially etched to form two groove portions in the second magnetic layer so that a region sandwiched by the two groove portions may serve as the second uniform width portion of the second magnetic layer. In such a case, the groove portion is preferably formed to have a width of at least 1 μm.

Other and further objects, features and advantages of the invention will appear more fully from the following description.

BRIEF DESCRIPTION OF THE DRAWINGS

FIGS. 1A and 1B are cross-sectional views for describing one step of a method of manufacturing a thin-film magnetic head of a first embodiment of the present invention.

FIGS. 2A and 2B are cross-sectional views for describing the step continued from FIGS. 1A and 1B.

FIGS. 3A and 3B are cross-sectional views for describing the step continued from FIGS. 2A and 2B.

FIGS. 24A and 24B are cross-sectional views for describing the step continued from FIGS. 23A and 23B.

FIGS. 25A and 25B are cross-sectional views for describing the step continued from FIGS. 24A and 24B.

DETAILED DESCRIPTION OF THE PREFERRED EMBODIMENTS

Preferred embodiments of the invention will now be described in detail with reference to the accompanying drawings.

First Embodiment

An exemplary method of manufacturing a composite thin-film magnetic head as a method of manufacturing a thin-film magnetic head according to a first embodiment of the invention will be described with reference to FIGS. 1A and 1B to FIG. 11. The thin-film magnetic head of this embodiment will be described together with the method of manufacturing a thin-film magnetic head of this embodiment because it is embodied by this method.

Figures 4A, 4B:
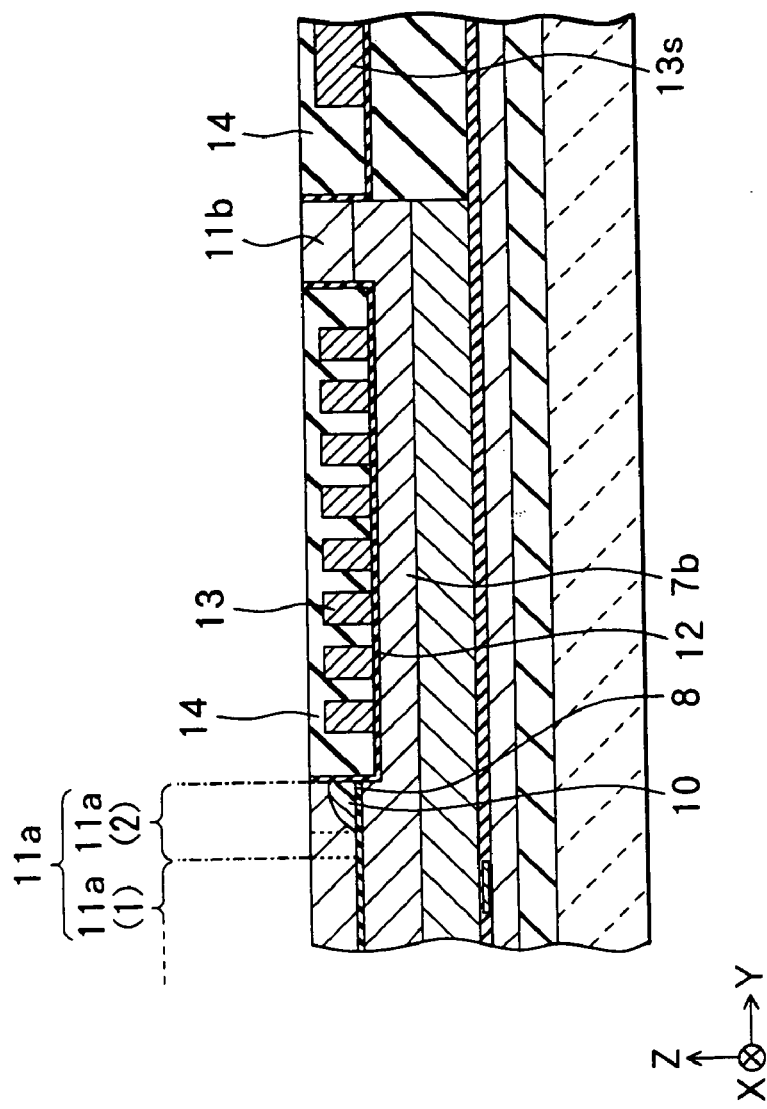
FIGS. 4A and 4B are cross-sectional views for describing the step continued from FIGS. 3A and 3B.
Figures 5A, 5B:
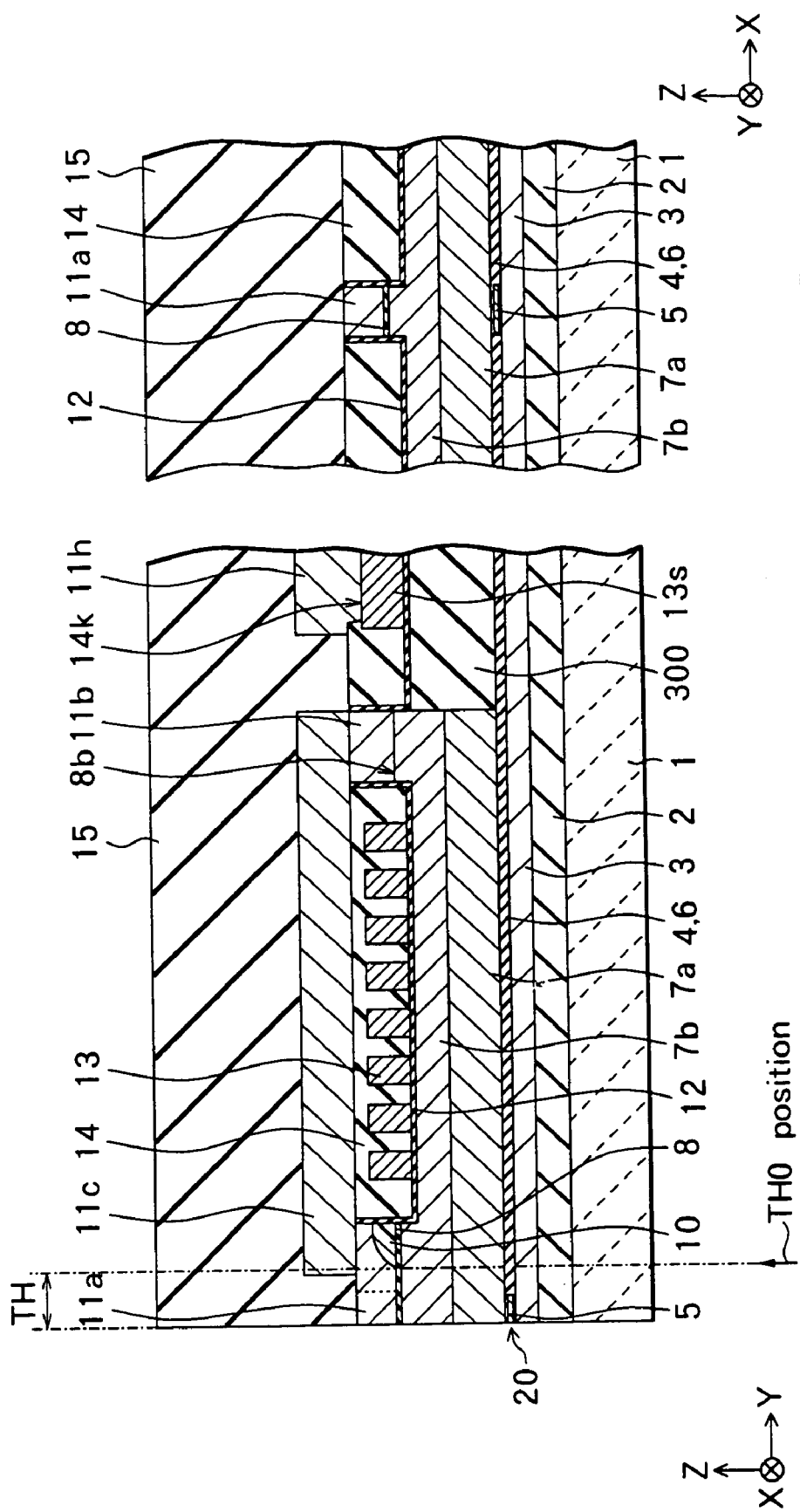
FIGS. 5A and 5B are cross-sectional views for describing the step continued from FIGS. 4A and 4B.

Each FIGS. 1A to 5A illustrates a cross section perpendicular to an air bearing surface, while each FIGS. 1B to 5B illustrates a cross section in parallel to the air bearing surface of a pole. FIG. 6 to FIG. 11 are perspective views corresponding to major manufacturing process. More specifically, FIG. 9 to FIG. 11 correspond to the states shown in FIG. 2, FIG. 3, and FIG. 5, respectively. It should be noted, however, that an insulating film 12, a thin-film coil 13, and the like in FIG. 3 are not shown in FIG. 10, and that insulating films 12 and 14, the thin-film coil 13, an overcoat layer 15, and the like in FIG. 5 are not shown in FIG. 11.

In the following description, the X-axis, Y-axis, and Z-axis directions in FIGS. 1A and 1B to FIG. 11 are referred to as "width direction", "height direction", and "thickness direction", respectively. In addition, the air bearing surface side (or the side on which the air bearing surface 20 is formed in a later step) in the Y-axis direction is referred to as "front side (or in front)", and the opposite side as "rear side (or behind)".

<Method of Manufacturing a Thin-Film Magnetic Head>

According to the manufacturing method of the present embodiment, as shown in FIGS. 1A and 1B, an insulating layer 2 formed of, for example, alumina and having a thickness of approximately 3 μm to 5 μm is first deposited on a substrate 1 formed of, for example, altic ($Al_2O_3 \cdot TiC$). On the insulating layer 2, a permalloy of approximately 3 μm in thickness is selectively formed by photolithography and plating, to thereby form a bottom shield layer 3 for a reproduction head.

As also shown in FIGS. 1A and 1B, for example, alumina having a thickness of approximately 100 nm to 200 nm is sputter-deposited on the bottom shield layer 3, thereby forming a shield gap film 4. An MR film 5 for constituting an MR element, which is an important part of the reproduction head, is formed on the shield gap film 4, and patterned to a desired shape through high precision photolithography. Lead layers (not shown) serving as an extraction electrode layer electrically connected to the MR film 5 is formed on both sides of the MR film 5. Thereafter, a shield gap film 6 is formed on the lead layers, the shield gap film 4 and the MR film 5, so that the MR film 5 is buried in the shield gap films 4 and 6. It should be noted that the MR film 5 described above corresponds to one specific example of a "magnetic transducing function element film" of the invention.

As shown in FIGS. 1A and 1B, a top shield-cum-bottom pole (hereinafter referred to simply as a "bottom pole") 7 is then selectively formed on the shield gap film 6. This bottom pole 7 is formed to have a two-layered structure as described below. For example, permalloy having a thickness of approximately 1.5 μm to 2.5 μm is formed on the shield gap film 6 by such a method as an electrolytic plating or the like. On the thus formed permalloy layer, about 1 μm to 2 μm in thickness is formed of a material, such as iron nitride (FeN), by, for example, sputtering. The above permalloy and iron nitride layers are successively etched and patterned by a reactive ion etching (hereinafter referred to simply as "RIE") using a mask with prescribed shape and material, so that a first bottom pole 7a of permalloy and a second bottom pole 7b of iron nitride are selectively formed. The first bottom pole 7a and the second bottom pole 7b are magnetically coupled by being in contact with each other. The above step of patterning the obtained layer of iron nitride by RIE will be described hereinafter in detail. It should be noted that the bottom shield layer 3 and the bottom pole 7 (top shield layer) correspond to one specific example of a "third magnetic layer" of the invention, and the bottom pole 7 composed of the first and second bottom poles 7a and 7b, respectively, corresponds to one specific example of a "second magnetic layer" of the invention.

Next, as shown in FIGS. 1A and 1B, an insulating film 300 of alumina is formed over the entire surface of the layer structure as mentioned above, and the surface of the insulating film 300 is polished by, for example, a chemical mechanical polishing (CMP) until the second bottom pole 7b is exposed, whereby the entire surface is planarized.

As shown in FIGS. 2A and 2B, a write gap layer 8 of, for example, alumina having a thickness of approximately 0.15 μm to 0.3 μm is formed by sputtering or the like on the second bottom pole 7b. At this time, an opening 8b is formed in the write gap layer 8, so that the bottom pole 7 is brought into contact with a top pole 11 (a top pole tip 11a, a magnetic path connection portion 11b, and a top yoke 11c) which will be formed in a later step. It should be noted that the write gap layer 8 corresponds to one specific example of a "gap layer" of the invention.

As shown in FIGS. 2A and 2B, on a region of the write gap layer 8 located in front of the region where the thin-film coil 13 will be disposed in a later step, an insulating film pattern 10 of about 0.5 μm to 1.5 μm in thickness is selectively formed of, for example, organic photoresist through photolithography with high precision. The insulating film pattern 10 is subjected to heat treatment at a temperature of, for example, 200° C. to 250° C. As a result of this heat treatment, the insulating film pattern 10 has a rounded slope in the vicinity of its edge portion. This insulating film pattern 10 defines the throat height zero position (TH0 position) which is the reference position for determining the throat height (TH), and also defines the apex angle ($\theta$).

Figure 9:
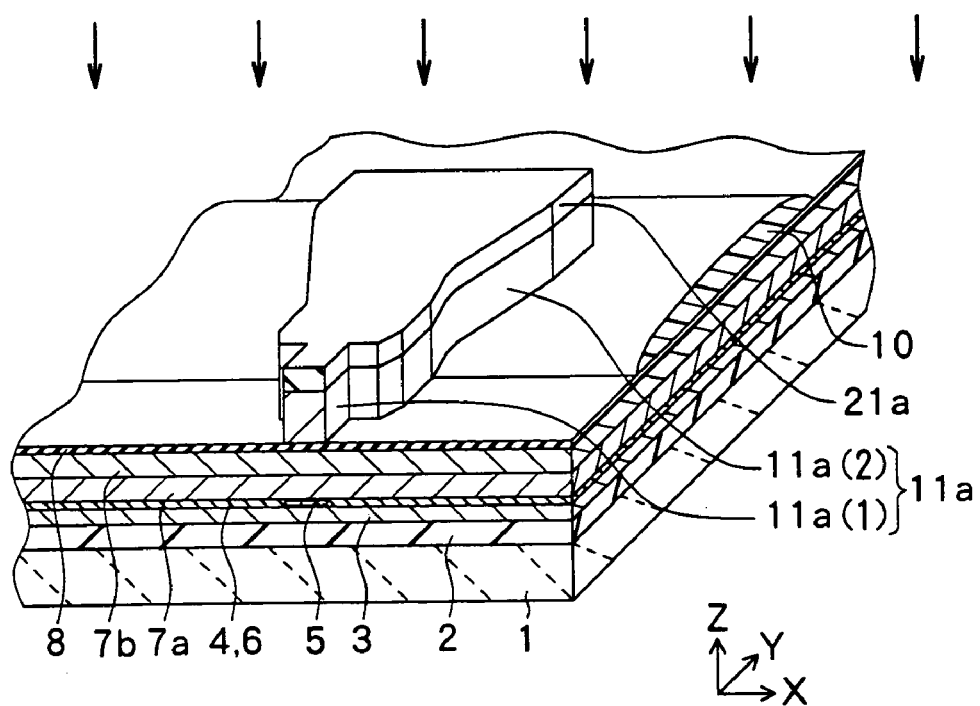
FIG. 9 is a perspective view corresponding to the cross-sectional views of FIGS. 2A and 2B.

As shown in FIGS. 2A and 2B and FIG. 9, the top pole tip 11a of about 1.5 μm to 2.5 μm in thickness, constituting part of the top pole 11, is selectively formed of, for example, iron nitride in a region extending from the surface of a front portion of the insulating film pattern 10 to the area located over the flat write gap layer 8 in front of the insulating film pattern 10. At the same time the top pole tip 11a is formed, the magnetic path connection portion 11b (not shown in FIG. 9), which is also part of the top pole 11, is formed in the opening 8b. The top pole tip 11a has such a planar shape as that shown in FIG. 12, which will be described hereinafter, and has a tip portion 11a(1) having a uniform width defining a recording track width on a recording medium (not shown), and an widened width portion 11a(2) having a width greater than the tip portion 11a(1). It should be noted that the top pole tip 11a corresponds to one specific example of a "first magnetic layer portion" of the invention.

Reference to FIGS. 2A and 2B and FIG. 9 as well as FIG. 6 to FIG. 8, a method of forming the top pole tip 11a will be described in detail.

Figure 6:
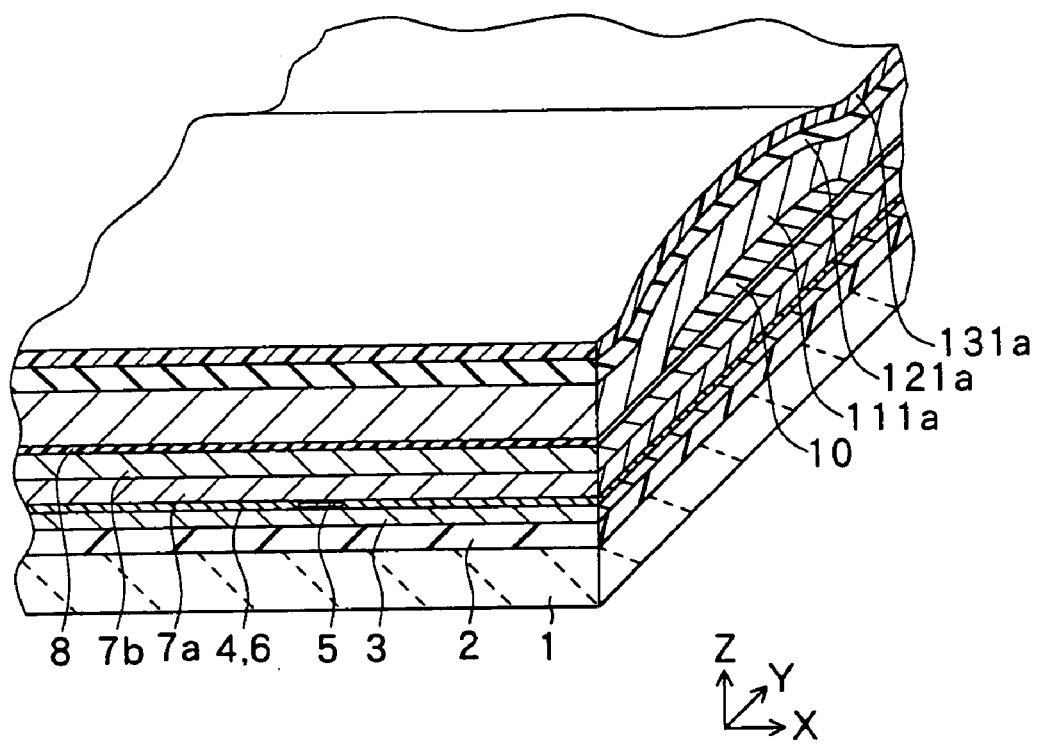
FIG. 6 is a perspective view for describing the step between the steps shown in FIGS. 1A and 1B and FIGS. 2A and 2B.

First, as shown in FIG. 6, a magnetic material with high saturation magnetic flux density, such as iron nitride, is formed to have a thickness of approximately 1.5 μm to 2.5 μm over the entire surface of the layer structure as described above by sputtering, to thereby form a top pole tip precursor layer 111a (hereinafter referred to simply as an "iron nitride layer" as well). This top pole tip precursor layer 111a is a preparation layer which is patterned by etching in a later step to serve as a top pole tip 11a. In the following description, such a preparation layer which will be patterned to a predetermined shape in a later step is called, and represented as, a "precursor layer". The top pole tip precursor layer 111a may be formed of other materials than iron nitride, such as an amorphous alloy with a high saturation magnetic flux density, namely, zirconium-cobalt-iron (FeCoZr) and the like. On the top pole tip precursor layer 111a, a first mask precursor layer 121a of about 2 μm to 3 μm in thickness is formed of an inorganic material, such as alumina, by sputtering or the like. The first mask precursor layer 121a will be patterned by etching in a later step, and serve as a first mask 21a used for patterning the top pole tip precursor layer 111a. Other than alumina, such an inorganic material as aluminum nitride (AlN) may also be used for forming the first mask precursor layer 121a. Photoresist is applied on the first mask precursor layer 121a to form a second mask precursor layer 131a of a photoresist film. The second mask precursor layer 131a will be patterned through photolithography in a later step, and serve as a second mask 31a used for patterning the first mask precursor layer 121a. It should be noted that the top pole tip precursor layer 111a corresponds to one specific example of a "magnetic material layer" of the invention, and the first mask precursor layer 121a corresponds to one specific example of a "mask precursor layer" of the invention.

Figure 7:
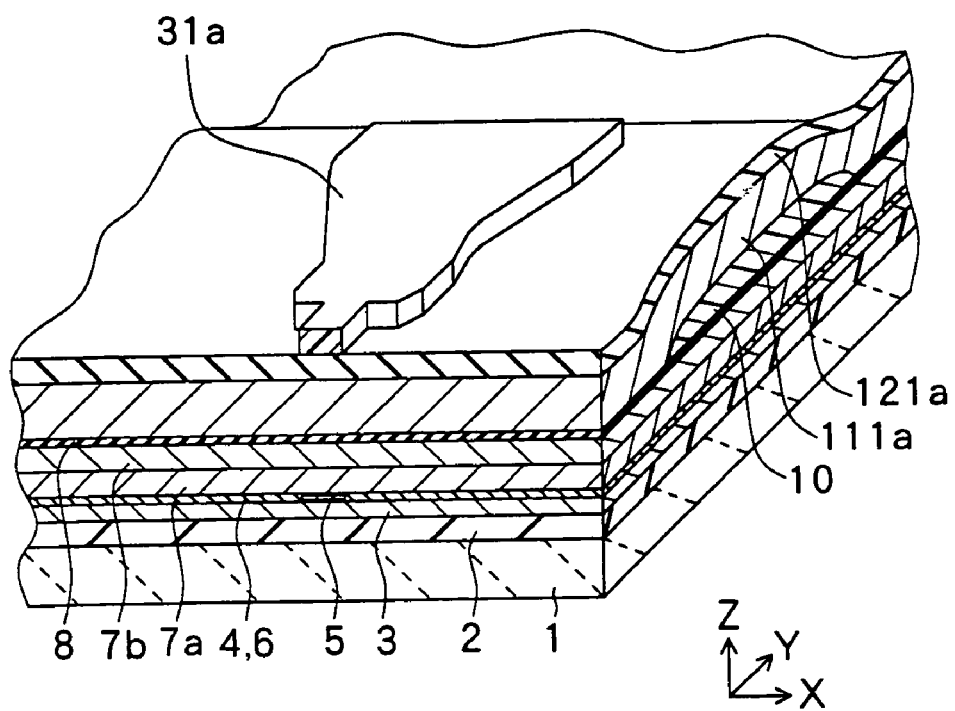
FIG. 7 is a perspective view for describing the step continued from FIG. 6.

The second mask precursor layer 131a of a photoresist film is selectively exposed to light and patterned through photolithography, to thereby form the second mask 31a, as shown in FIG. 7. The second mask 31a has a shape corresponding to a planar shape of the top pole tip 11a. By using an inorganic material with a relatively low reflectance, such as alumina, for forming the first mask precursor layer 121a lying under the second mask precursor layer 131a, almost no reflected light generates from the surface of the first mask precursor layer 121a during light exposure in the photolithography step, deformation of the pattern can be suppressed which would otherwise be caused by an increase or a decrease in exposure area. As a result, especially the very small uniform width portion of the second mask 31a that corresponds to the pole can be formed with high precision. The above-described patterning of the second mask precursor layer 131a need not be achieved by photolithography, and the second mask precursor layer 131a may be selectively etched by RIE, ion milling, or the like. It should be noted that the second mask 31a corresponds to one specific example of a "second mask" of the invention as a "photoresist film pattern".

Figure 8:
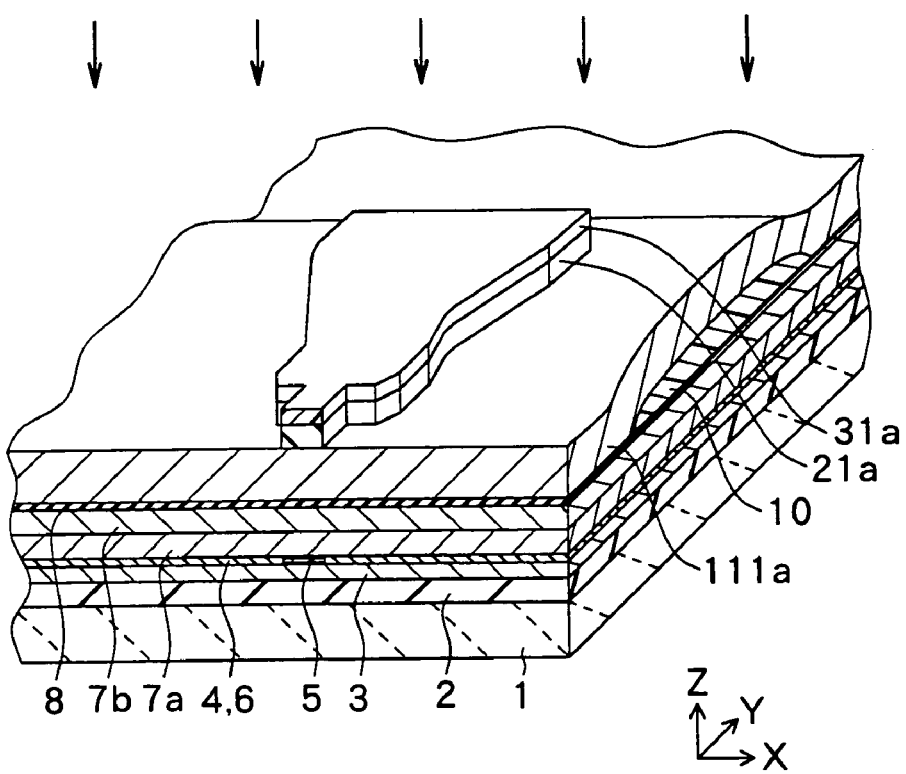
FIG. 8 is a perspective view for describing the step continued from FIG. 7.

By selectively etching the first mask precursor layer 121a through RIE using the second mask 31a, the first mask 21a of alumina is formed, as shown in FIG. 8. Through this etching process, the first mask precursor layer 121a (not shown in FIG. 8) is selectively removed to leave the portion that corresponds to the second mask 31a. Similarly to the second mask 31a, the first mask 21a has a shape corresponding to the planar shape of the top pole tip 11a. At the same time the region of the first mask precursor layer 121a, uncovered with the second mask 31a, is etched, the second mask 31a itself is etched, resulting in a reduction in thickness of the second mask 31a. The second mask 31a need not to remain when formation of the first mask 21a is completed, and be eliminated in the etching process.

By selectively etching the top pole tip precursor layer 111a through RIE using the first mask 21a, the top pole tip 11a of iron nitride is formed, as shown in FIGS. 2A and 2B and FIG. 9. Through this etching process, the top pole tip precursor layer 111a (not shown in FIGS. 2A and 2B and FIG. 9) is selectively removed to leave the portion that corresponds to the first mask 21a. It should be noted that the etching product can be prevented from reattaching to the peripheral wall of the unetched portion (masked portion of the top pole tip 11a) during the etching process with RIE by using iron nitride, an amorphous alloy (zirconium-cobalt-iron), or the like for forming the top pole tip precursor layer 111a. Therefore, especially the tip portion 11a(1) of the top pole tip 11a can be formed with high precision.

It is preferable in the etching process with RIE that the process temperature is in a range of 50° C. to 300° C., and that gas containing at least one of chlorine ($Cl_2$), boron dichloride ($BCl_2$), boron trichloride ($BCl_3$), and hydrogen chloride (HCl), with hydrogen ($H_2$) oxygen ($O_2$), argon (Ar), and the like added thereto is used as etching gas. Employing such conditions allows the etching process with RIE to be completed in a short time. In particular, when the top pole tip precursor layer 111a is etched with RIE, the process temperature in a range of 150° C. to 250° C. is preferable as a condition for the above processing. In addition, when, for example, chlorine is used as the etching gas, the amount of supplying the gas is preferably, for example, 100 ml to 200 ml per minute. Similarly to the second mask 31a, the first mask 21a may remain at the time formation of the top pole tip 11a is completed, or may be eliminated in the etching process. The above-described approach enables formation of the top pole tip 11a with high precision and in a short time. The above-described second bottom pole 7b can also be formed with high precision and in a short time by employing the approach similar to that for the top pole tip 11a in forming the second pole 7b.

The magnetic path connection portion 11b is also formed by the approach similar to that for the top pole tip 11a. For forming the magnetic path connection portion 11b, another mask 21b (see FIG. 2A) is used which is formed of the same material and by the same step as the first mask 21a.

The method of manufacturing a thin-film magnetic head according to the present embodiment will be further described with reference to FIG. 3B and FIG. 10.

Figure 10:
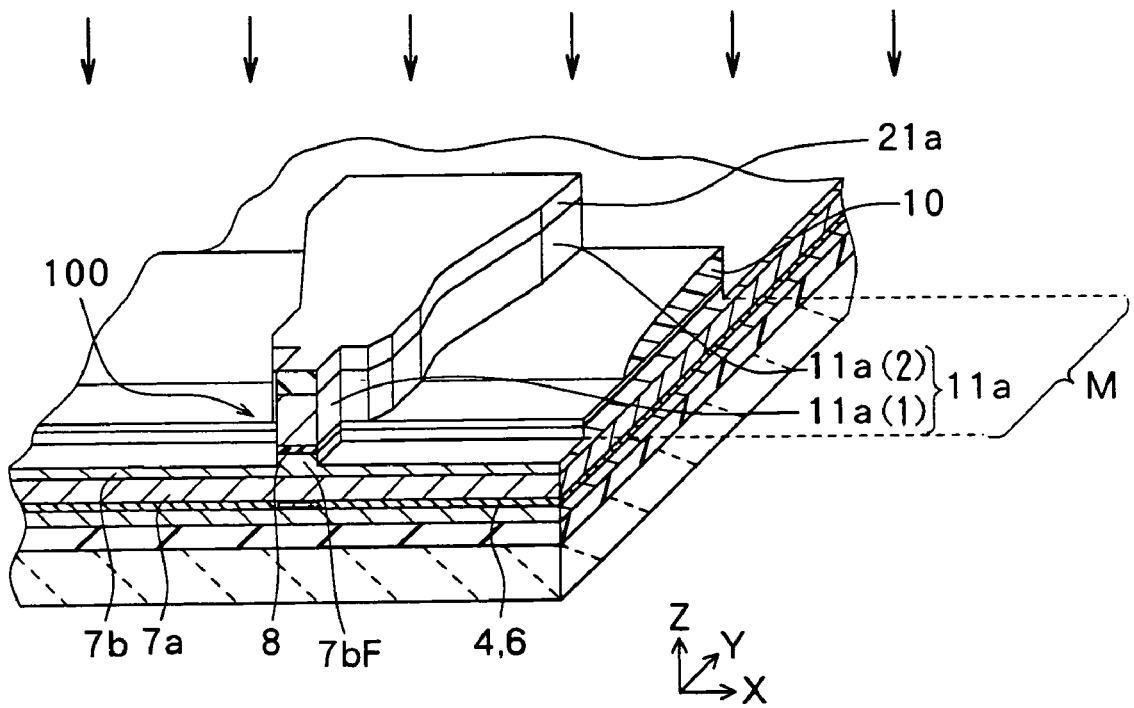
FIG. 10 is a perspective view corresponding to the cross-sectional views of FIGS. 3A and 3B.

As shown in FIG. 3B and FIG. 10, under the conditions similar to those for forming, for example, the top pole tip 11a, the write gap layer 8 and the second bottom pole 7b are etched with the RIE by approximately 0.5 µm using as a mask the first mask 21a (not shown in FIG. 3B) and the unillustrated photoresist film selectively disposed on a surface of a region M extending from the foremost position of the widened width portion 11a(2) of the top pole tip 11a to the rearmost position thereof, and on a surface of the magnetic path connection portion 11b (not shown in FIG. 10). At this time, the part of the insulating film pattern 10 extending rearward from the rearmost end of the top pole tip 11a is etched simultaneously. Through this etching process, the write gap layer 8 and the second bottom pole 7b are selectively removed to leave the portions corresponding to the tip portion 11a(1) of the top pole tip 11a, to thereby form a pole tip 100 having a trim structure. The pole tip 100 is composed of the tip portion 11a(1) of the top pole tip 11a, a portion (7bF) of the second bottom pole 7b that corresponds to the tip portion 11a(1), and part of the write gap layer 8 sandwiched therebetween, and each of these portions has substantially the same width. The etching process with the RIE enables formation of the pole tip 100 with high precision and in a short time. In particular, when etching process is performed with the RIE to form the pole tip 100, etching gas containing chlorine of in the order of 20 ml to 40 ml per minute and boron trichloride of in the order of 60 ml to 80 ml per minute, for example, is preferably used.

No problems arise if the first mask 21a is etched away during the above-described RIE process because, in such a case, the top pole tip 11a itself serves as an etching mask for the underlying regions (the write gap layer 8 and the second bottom pole 7b). However, as the film thickness of the top pole tip 11a is reduced by etching, the top pole tip 11a is preferably formed thicker taking the reduced film thickness into consideration. It should be noted that the tip portion 11a(1) corresponds to one specific example of a "first uniform width portion" of the invention, and the portion 7bF corresponds to one specific example of a "second uniform width portion" of the invention.

As shown in FIG. 3A, an insulating layer 12 of 0.5 µm to 1.5 µm in thickness is formed of, for example, alumina over the entire surface of the layer structure as mentioned above.

Figure 12:
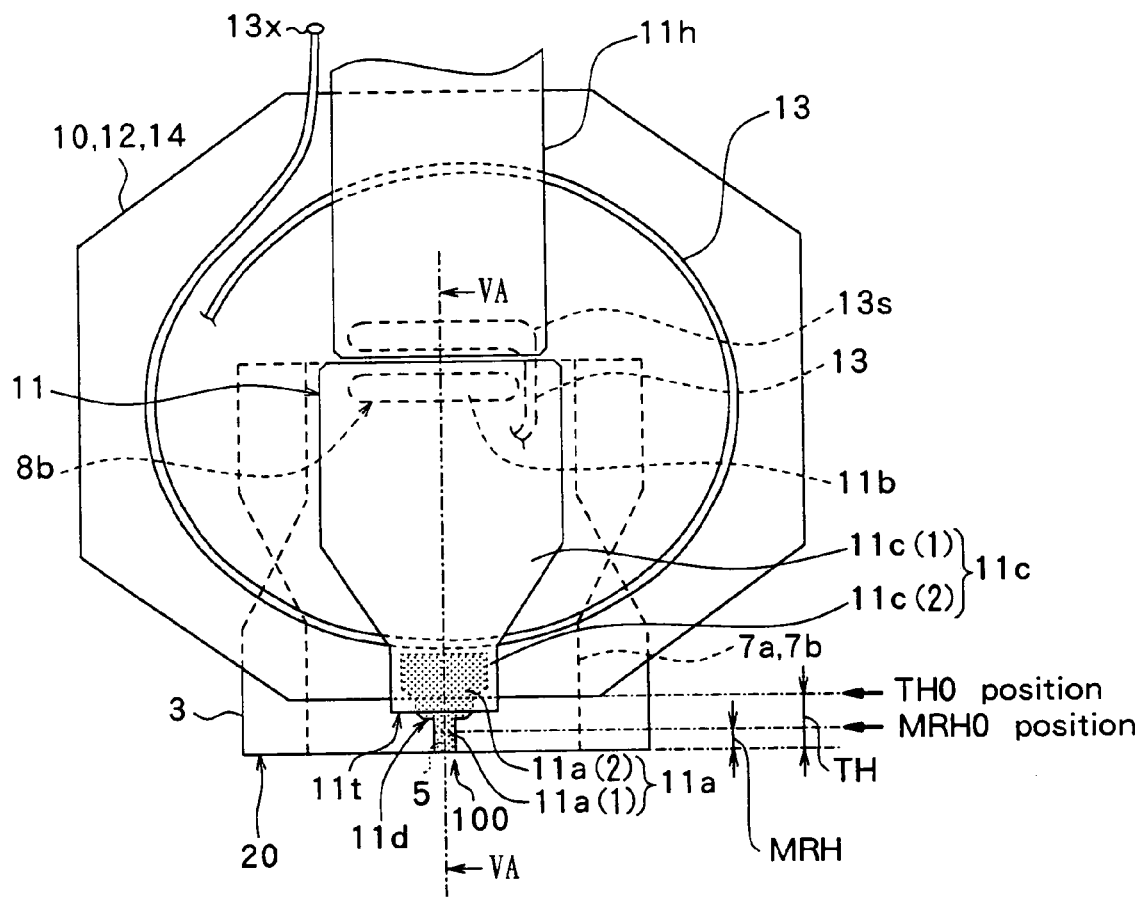
FIG. 12 is a plan view illustrating a planar structure of the thin-film magnetic head of the first embodiment of the present invention.

Next, as shown in FIG. 3A, the thin-film coil 13 having a thickness of approximately 1 µm to 2 µm used for an inductive-type recording head formed of, for example, copper (Cu) is formed by electrolytic plating on a region of the flat insulating film 12 located between the top pole tip 11a and the magnetic path connection portion 11b. The thin-film coil 13 has, for example, a spiral planar structure as shown in FIG. 12, which will be described hereinafter. FIG. 3A shows only part of the thin-film coil 13. At the same time the thin-film coil 13 is formed, a coil connection portion 13s is integrally formed with the thin-film coil 13 at, for example, an inner end thereof located on the insulating film 12. The coil connection portion 13s is used for electrically connecting the thin-film coil 13 and a coil connection wiring 11h (see FIG. 5A) which will be formed in a later step.

As shown in FIGS. 4A and 4B, an insulating film 14 of about 3 μm to 4 μm in thickness is formed of, for example, alumina over the entire surface of the layer structure as mentioned above, to thereby bury therein an uneven configuration region composed of the top pole tip 11a, the magnetic path connection portion 11b, the thin-film coil 13, the coil connection portion 13s, and the like. Thereafter, the entire surface of the insulating film 14 is polished and planarized through, for example, the CMP. Here, the surface of the insulating film 14 is polished until both the top pole tip 11a and the magnetic path connection portion 11b are exposed. Since each gap between turns of the thin-film coil 13 is filled with the insulating film 14, the turns are insulated from each other. The materials which may be used for filling in each gap between the turns of the thin-film coil 13 other than alumina include, among others, insulating materials, such as photoresist or spin on glass (SOG), exhibiting fluidity when heated. When photoresist, SOG, or the like is used for filling in the gaps between the turns, these gaps are filled with such a material more tightly than alumina, and therefore insulating effect can be more ensured. In such a case, it is preferable to first fill in the gaps between the turns with the above insulating material, and then provide the insulating film 14 formed of alumina thereon. By using alumina as a material for forming the insulating film 14, a polishing surface of a CMP polishing disc can be prevented from clogging, and the polished surface can be formed more smoothly, different from the case of using a soft material, such as photoresist.

As shown in FIGS. 5A and 5B, the portion of the insulating film 14 covering over the coil connection portion 13s is selectively removed through, for example, the RIE or ion milling, to thereby form an opening 14k for connecting the coil connection portion 13s and the coil connection wiring 11h which will be formed in a later step.

Figure 11:
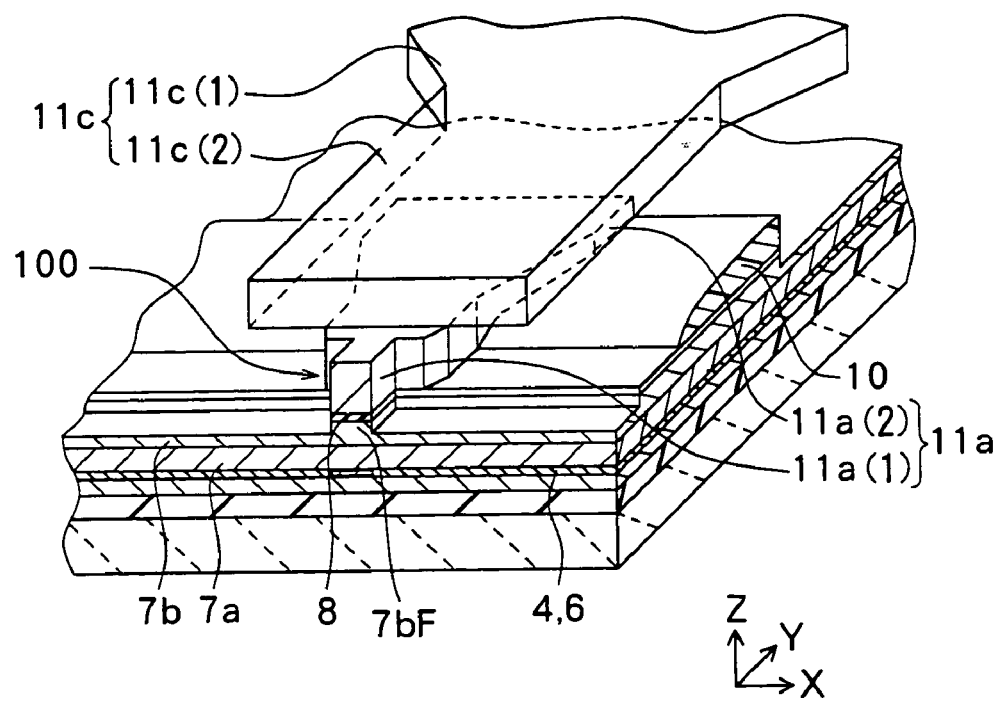
FIG. 11 is a perspective view corresponding to the cross sectional views of FIGS. 5A and 5B.

As shown in FIGS. 5A and 5B and FIG. 11, the top yoke 11c of about 2 μm to 3 μm in thickness, which will form part of the top pole 11, is selectively formed on the portion of the planarized region that extends from the magnetic path connection portion 11b (not shown in FIG. 11) to the top pole tip 11a. At the same time the top yoke 11c is formed, the coil connection wiring 11h (not shown in FIG. 11) is also formed at a region extending from the top portion of the opening 14k to an external circuit (not shown). The coil connection wiring 11h is used for electrically connecting the coil connection portion 13s and the unillustrated external circuit. The top yoke 11c and the coil connection wiring 11h are preferably formed of, for example, iron nitride, an amorphous alloy (zirconium-cobalt-iron), or the like, having a high saturation magnetic flux density. Similarly to the top pole tip 11a and the magnetic path connection portion 11b described above, the top yoke 11c and the coil connection wiring 11h are formed by RIE under a predetermined condition. The above-described method also makes it possible to form the top yoke 11c and the coil connection wiring 11h with high precision and in a short time.

The top yoke 11c has such a planar shape as, for example, shown in FIG. 12 described hereinafter, and includes a yoke portion 11c(1) located over the thin-film coil 13 and a connection portion 11c(2) partially overlapping the top pole tip 11a and located in front of the yoke portion 11c(1). In forming the top yoke 11c, it is preferable that the edge of its forefront portion (hereinafter referred to simply as the "foremost end") is located slightly in front of the foremost end of the insulating pattern 10, i.e. the throat height zero position (TH0 position), and that the edge of its rearmost portion (hereinafter referred to as the "rearmost end") is substantially in line with the rearmost end of the magnetic path connection portion 11b. The top yoke 11c is magnetically coupled with the bottom pole 7 sandwiching the magnetic path connection portion 11b in the opening 8b, and is also in contact with, and therefore magnetically coupled with, the top pole tip 11a. It should be noted that the top yoke 11c corresponds to one specific example of a "second magnetic layer portion" of the invention, and the top pole 11 composed of the top pole tip 11a, the magnetic path connection portion 11b and the top yoke 11c corresponds to one specific example of a "first magnetic layer" of the invention.

As shown in FIGS. 5A and 5b, the overcoat layer 15 is formed of, for example, alumina covering the entire surface of the layer structure as mentioned above. Finally, the air bearing surface 20 of the recording and reproducing heads is formed by machining or polishing, whereby a thin-film magnetic head is completed.

<Structure of Thin-Film Magnetic Head>

A structure of the thin-film magnetic head of this embodiment will next be described with reference to FIG. 12.

FIG. 12 schematically shows a planar structure of the thin-film magnetic head manufactured by the method of manufacturing a thin-film magnetic head according to the present embodiment. In FIG. 12, the insulating films 12 and 14, the overcoat layer 15, and the like are not illustrated. In addition, the thin-film coil 13 is shown by only the outermost periphery portion thereof in the figure, and the insulating pattern 10 is shown by only the outermost end thereof in the figure. FIG. 5A shows a cross section taken along the line VA—VA in FIG. 12. The notations for X, Y, and Z axis directions shown in FIG. 12 are the same as those in FIGS. 1A and 1B through FIG. 11.

As shown in FIG. 12, the foremost end of an insulation layer constituted of the insulating pattern 10, the insulating film 12 and the insulating film 14 is located at the reference position for determining the throat height (TH), that is, throat height zero position (hereinafter referred to simply as "TH0 position"). The throat height (TH) is defined as the distance between the position of the foremost end of the insulating pattern 10 (TH0 position) and the air bearing surface 20. The "MRH0 position" in FIG. 12 indicates the position of the rearmost end of the MR film 5, that is, the MR height zero position. The MR height is the distance between the MR height zero position and the air bearing surface 20.

The top pole 11 is composed of the top pole tip 11a, the magnetic path connection portion 11b, and the top yoke 11c, formed separately. In other words, the top pole 11 is an assembly of these parts.

The top yoke 11c includes the yoke portion 11c(1) having a large area for containing magnetic flux generated in the thin-film coil 13, and the connection portion 11c(2) having a uniform width smaller than the yoke portion 11c(1). The yoke portion 11c(1) has, for example, that is uniform width in a rear region, and is gradually decreased in a front region as it approaches the air bearing surface 20. The connection portion 11c(2) has such a width, for example, that is greater than the maximum width of the widened width portion 11a(2) of a top pole tip 11a described hereinafter. It should be noted, however, that such widths as described above are only the examples, and the width of the former may be, for example, smaller than the width of the latter.

The top pole tip 11a has such a planar shape, for example, that its width increases as it gets farther from the air bearing surface 20, and includes the tip portion 11a(1) and the widened width portion 11a(2) in the order named from the air bearing surface 20. The tip portion 11a(1) has a uniform width almost all over the area, and the width defines a recording track width in recording. The widened width portion 11a(2) has a front portion having a greater width than the tip portion 11a(1), and a rear portion having an even greater width than the front portion. In other words, a step in the width direction is created in a coupling portion of the tip portion 11a(1) and the front portion of the widened width portion 11a(2). Both corners of the both portions (front and rear portions) of the widened width portion 11a(2) on the air bearing surface 20 side are, for example, chamfered and tapered.

A step surface 11d in the step of the top pole tip 11a on the side of the widened width portion 11a(2) is positioned, for example, between the MRH0 position and the TH0 position. A front end surface 11t of the top yoke 11c is positioned, for example, between the step surface 11d of the top pole tip 11a and the TH0 position. The position of the end surface 11t of the top yoke 11c is not limited to the above example, and the end surface 11t may be, for example, in line with the TH0 position, or may be located behind the TH0 position. The centers of the top yoke 11c and the top pole tip 11a in the width direction coincide with each other.

As shown in FIG. 5A, FIG. 11 and FIG. 12, part of the front portion of the top yoke 11c partially overlaps the widened width portion 11a(2) of the top pole tip 11a, and is magnetically coupled thereto. As shown in FIGS. 5A and 5B and FIG. 12, the top yoke 11c is also magnetically coupled to the bottom pole 7 sandwiching the magnetic path connection portion 11b in the opening 8b. Therefore, the top pole 11 (the top pole 11a, the magnetic path connection portion 11b, and the top yoke 11c) and the bottom pole 7 (the first and second bottom poles 7a and 7b, respectively) are connected, thereby forming a propagation path for magnetic flux, that is, magnetic path.

As shown in FIG. 12, the thin-film coil 13 is a winding with a spiral planar shape, and at an inner end thereof the coil connection portion 13s is formed integrally with the thin-film coil 13. An end of the coil connection wiring 11h is in contact with the coil connection portion 13s and electrically connected thereto. The other end of the coil connection wiring 11h and an outer end 13x of the thin-film coil 13 are connected to an unillustrated external circuit, which enables to supply electricity to the thin-film coil 13.

As can be seen from FIGS. 5A and 5B, FIG. 10, and FIG. 12, the tip portion 11a(1) and the front portion of the widened width portion 11a(2) of the top pole 11a extend over the flat write gap layer 8, while the rear portion of the widened width portion 11a(2) extends over the slope of the insulating pattern 10.

<Function of the Thin-film Magnetic Head>

Next, functions of a thin-film magnetic head according to the present embodiment will be described with reference to FIG. 5A, FIG. 11 and FIG. 12.

Basic operation of the thin-film magnetic head, namely, operation of writing and reproducing data to and from a recording medium, will be briefly described here.

In the thin-film magnetic head of the present embodiment, when current flows to the thin-film coil 13 through an unillustrated external circuit in data writing operation, magnetic flux is generated in response thereto. The thus generated magnetic flux propagates from the yoke portion 11c(1) to the connection portion 11c(2) in the top yoke 11c, and then propagates through the widened width portion 11a(2) of the top pole tip 11a magnetically coupled with the top yoke 11c to the tip portion 11a(1). Magnetic flux reaching the tip portion 11a further propagates to the very tip portion thereof on the air bearing surface 20 side, and generates a signal magnetic field for recording in an external region located in the vicinity of the write gap layer 8. This signal magnetic field partially magnetizes the magnetic recording medium, so that information is recorded therein.

On the other hand, in reproduction, sense current is applied to the MR film 5 of the reproduction head. Since the resistance of the MR film 5 varies with a reproduction signal magnetic field from the magnetic recording medium, the change in resistance is detected by a change in sense current, to thereby read out information recorded on the magnetic recording medium.

<Function and Effect of the Method of Manufacturing Thin-Film Magnetic Head>

Characteristic functions and effects of the method of manufacturing a thin-film magnetic head according to the present embodiment will be described with reference to FIG. 9 and FIG. 10.

According to the present embodiment, as shown in FIG. 9, the top pole tip precursor layer 111a (not shown in FIG. 9; see FIG. 8) is selectively etched and patterned through the RIE with use of the first mask 21a, to thereby form the top pole tip 11a. The processing speed of the RIE is generally higher than that of the ion milling. In addition, in the etching process with RIE, especially chlorine-type gas is selected, and the process temperature is adjusted to be in a range of 50° C. to 250° C. The etching conditions are thus optimized so as to enhance chemical reactivity during the etching process. Therefore, the top pole tip 11a can be formed in an extremely short time as compared with the related art method with ion milling. Such functions and effects can also be obtained in forming other magnetic layer portions (the second bottom pole 7b, the magnetic path connection portion 11b, and the top yoke 11c), the pole tip 100, and the like by using the method similar to that for forming the top pole tip 11a. By forming the pole tip 100 through RIE as described above, process time can be reduced as compared to the process in which the tip portion 11a(1) and the portion 7bF are formed by ion milling and the write gap layer 8 is selectively removed by RIE.

According to the present embodiment, iron nitride, an amorphous alloy (zirconium-cobalt-iron), or the like is used for forming the top pole tip precursor layer 111a, and the top pole tip precursor layer 111a formed of such a material is etched through the RIE, whereby the top pole tip 11a can be formed with high precision. Such functions and effects can be obtained in forming other magnetic layer portions than the top pole tip 11a by using the similar material and method. It is particularly made possible to avoid a partial increase in width of the unetched portion caused by reattachment of etching products, which is the case in the related art method where a plated film of permalloy is subjected to ion milling, or avoid a partial decrease in width of the unetched portion due to excessive etching, and the like. As a result, the pole tip 100 can be made uniform throughout the thickness direction and the height direction as shown in FIG. 10.

As described above, according to the method of manufacturing a thin-film magnetic head of the present embodiment, the respective magnetic layer portions (the second bottom pole 7b, the top pole tip 11a, the magnetic path connection portion 11b, the top yoke 11c, and the like) constituting a thin-film magnetic head is formed through the RIE under the appropriate conditions, to thereby reduce the time required for such formation as compared to the related art method with ion milling. Since the top pole tip 100 with a trim structure is also formed through the RIE, the time required for manufacturing the entire thin-film magnetic head can be significantly reduced.

According to the present embodiment, iron nitride, an amorphous alloy (zirconium-cobalt-iron), or the like is used for forming the above magnetic material layers, and therefore each magnetic layer portion can be formed with high precision. The pole tip 100 including the tip portion 11a(1) of the top pole tip 11a has an uniform width over the entire region, whereby stable recording characteristics can be obtained, and the narrow magnetic pole for the sake of higher recording density can be achieved.

According to the present embodiment, an inorganic material, such as alumina, with slower etching rate is used as a material of the first mask 21a for patterning the top pole tip precursor layer 111a, the etched amount of the first mask 21a itself can be reduced as compared with the case where a soft material with a high etching rate, such as photoresist, is used as a material of the first mask 21a. As a result, a loss in thickness of the top pole tip 11a formed eventually can be reduced. Such effect can also be obtained for the magnetic path connection portion 11b formed by another mask 21b of alumina.

According to the present embodiment, the first mask 21a is also formed through the RIE, so that the time required for forming the first mask 21a can be reduced as compared to the process with ion milling. This also contributes to reduction in time for manufacturing the entire thin-film magnetic head.

According to the present embodiment, an inorganic material with a relatively low reflectance, such as alumina, is used for forming the first mask precursor layer 121a, and therefore deformation of the photoresist film due to the adverse effect of reflected light during exposure can be suppressed when the second mask precursor layer 131a is patterned through photolithography to form the second mask 31a. Consequently, the second mask 31a can be formed with high precision as well as the first mask 21a and the top pole tip 11a.

According to the present embodiment, when the pole tip 100 is formed by etching with the RIE, a region (such as the second bottom pole 7b and the like) where the thin-film coil 13 will be formed in a later step is also etched, so that the surface of the region where the thin-film coil 13 is formed is positioned lower than the bottom surface of the top pole tip 11a. Therefore, when the insulating film 14 is polished by the CMP until both the top pole tip 11a and the magnetic path connection portion 11b are exposed after the thin-film coil 13 is buried with the insulating film 14, the insulating film 14 having a sufficient thickness exists on the thin-film coil 13. As a result, insulation between the thin-film coil 13 and the top yoke 11c which will be formed in a later step can be ensured.

According to the present embodiment, while iron nitride, an amorphous alloy (zirconium-cobalt-iron), or the like is used as a material of the magnetic material layer for forming the respective magnetic layer portions constituting the thin-film magnetic head, other materials, such as permalloy, may be used. However, when permalloy is used for forming the magnetic material layer, the ratio of nickel (Ni) in the composition is preferably, for example, 45% or less. By thus decreasing the ratio of nickel in the composition, reattachment of the etching products can be prevented during the etching process with BTE.

While an electrolytic plating is employed for forming the bottom shield layer 3 and the first bottom pole 7a in the present embodiment, the formation method is not limited thereto, and both, or either one, of these portions may be formed, for example, by sputtering. In such a case, iron nitride, as well as permalloy as in the above example, can be used as the material. By thus using the method similar to that for the top pole tip 11a and the like, each portion can be formed with high precision and in a short time, which also contributes to reduction in time for forming the entire thin-film magnetic head.

While the bottom pole 7 has a two-layered structure in the present embodiment, the present invention is not limited thereto, and the bottom pole 7 may be formed of, for example, a single layer. When the bottom pole 7 has a single layer, the manufacturing process can be simplified as compared with the two-layered structure.

Although the tip portion 11a(1) of the top pole tip 11a and the portion 7bF of the second bottom pole 7b forming the pole tip 100 are successively formed in the present embodiment, the above description is only an example, and the portion 7bF may be formed, for example, immediately after forming the second bottom pole 7b.

While the write gap layer 8 is formed of alumina by sputtering in this embodiment, the material and manufacturing method are not limited to such examples. Other than alumina, the materials of the write gap layer 8 may be, for example, an inorganic insulating material, such as aluminum nitride (AlN), silicon oxide, silicon nitride, or the like, or a non-magnetic metal, such as tantalum (Ta), tungsten-titanium (WTi), titanium nitride (TiN), or the like. Further, the write gap layer 8 may be formed by a chemical vapor deposition (CVD), as well as by sputtering. If the write gap layer 8 is formed by such a method, it is possible to suppress creation of a pin hall in the gap layer, to thereby avoid leakage of magnetic flux through the write gap layer 8. Such an effect is advantageous especially when the write gap layer 8 is formed in a small thickness.

Figures 13A, 13B:
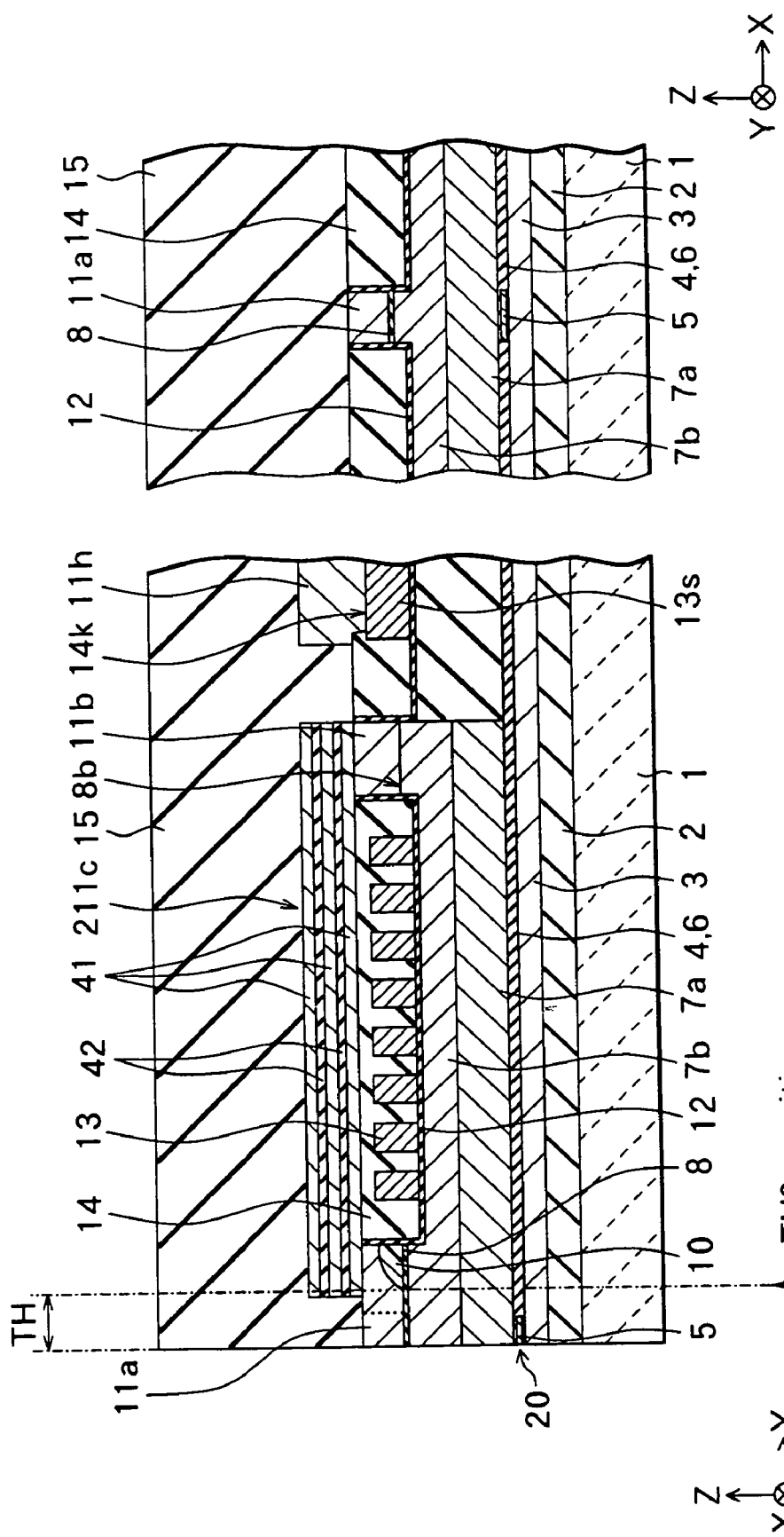
FIGS. 13A and 13B are cross-sectional views illustrating a variation of the top yoke in the thin-film magnetic head of the first embodiment of the present invention.

While the top yoke (11c) is described as having a single layer structure formed of iron nitride in the present embodiment, it is not limited to such a structure, and, as shown in FIGS. 13A and 13B, the top yoke may, for example, have a structure (211c) where a layer 41 formed of a material with high saturation magnetic flux density, such as iron nitride, and a layer 42 formed of an inorganic insulating material, such as alumina, are stacked alternately. When the top yoke is provided with such a structure, eddy current can be prevented from generating in the magnetic path, to thereby improve high frequency characteristics. When the above layer 41 formed of a material with high saturation magnetic flux density and a layer 42 formed of an inorganic insulating material are both formed through the RIE, the time required for the formation can be reduced. The portions other than the top yoke 211c shown in FIGS. 13A and 13B are the same as those shown in FIGS. 5A and 5B described above.

While the second mask precursor layer 131a is formed of a photoresist film and selectively patterned through the photolithography to form the second mask 31a in the present embodiment, the present invention is not limited thereto. For example, the second mask may be formed of a predetermined metal film. An example of forming the second mask of a metal film will be described with reference to FIG. 14 to FIG. 17. In FIG. 14 to FIG. 17, the components same as those shown in FIG. 6 are indicated by the same reference characters, and description thereof will be omitted.

<Variation 1-1>

Figure 14:
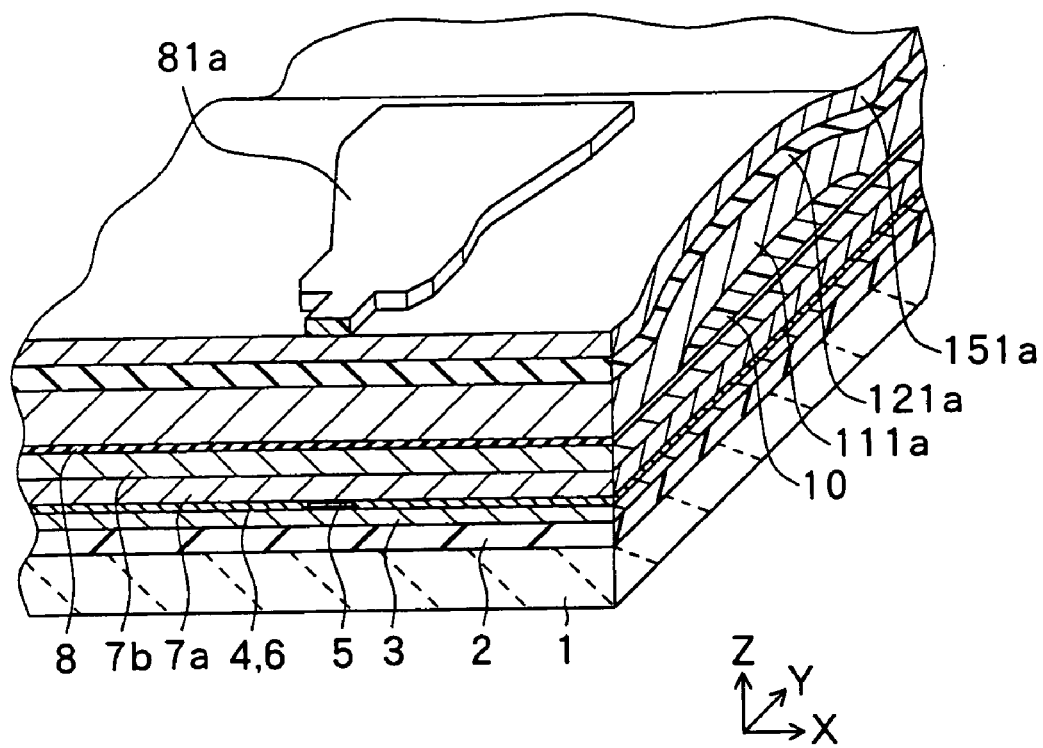
FIG. 14 is a perspective view for describing a variation of the method of forming the top pole tip of the first embodiment of the present invention.
Figure 15:
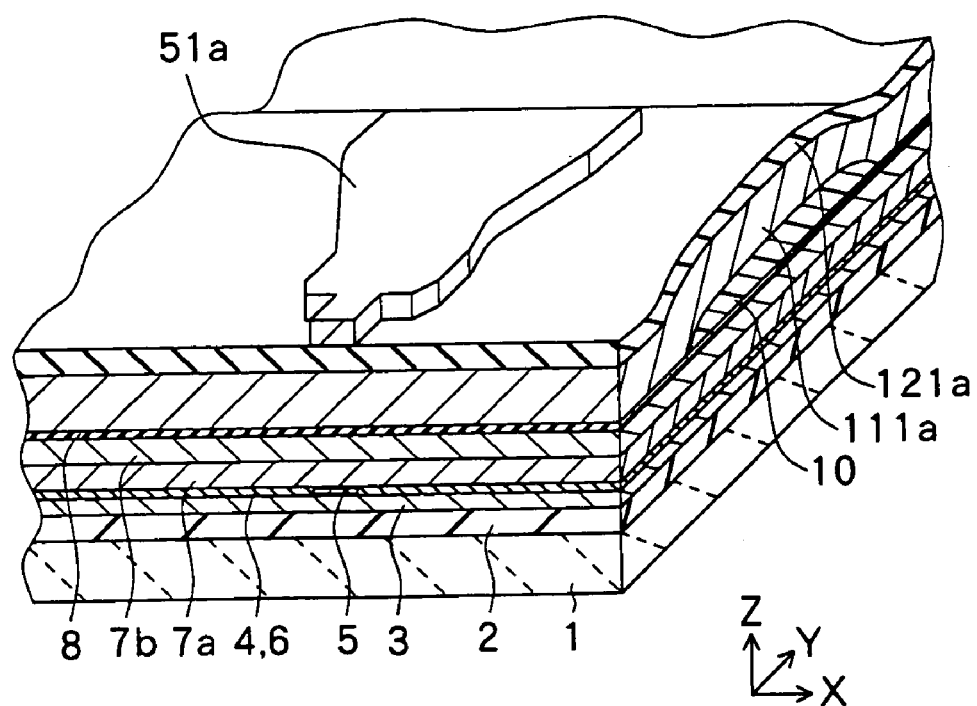
FIG. 15 is a perspective view for describing the step continued from FIG. 14.

FIG. 14 and FIG. 15 are the views for describing a first variation of the present embodiment. In this variation, a second mask precursor layer 151a formed of, for example, iron nitride, is formed by, for example, sputtering on the first mask precursor layer 121a, as shown in FIG. 14. At a prescribed position on the second mask precursor layer 151a, a third mask 81a formed of, for example, a photoresist film is provided. Using the thus formed third mask 81a as an etching mask, the second mask precursor layer 151a is selectively etched by, for example, ion milling, to thereby form a second mask 51a as shown in FIG. 15. It should be noted that the third mask 81a has a shape corresponding to the planar shape of the top pole tip 11a. As the steps following the step of forming the second mask 51a are the same as those in the above-described embodiment, description thereof will be omitted. Even when the thus formed second mask 51a is used, the same effects as those of the above-described embodiment can be obtained. The second mask precursor layer 151a may also be formed of a metal other than iron nitride (such as permalloy). In such a case, the second mask precursor layer 151a may be formed of a plated film obtained by growing permalloy or the like by electrolytic plating. It should be noted that the second mask precursor layer 151a corresponds to one specific example of a "metal layer" of the invention, and the second mask 51a corresponds to one specific example of the "second mask" as the "metal film pattern" of the invention formed by selectively etching the metal layer.

<Variation 1-2>

Figure 16:
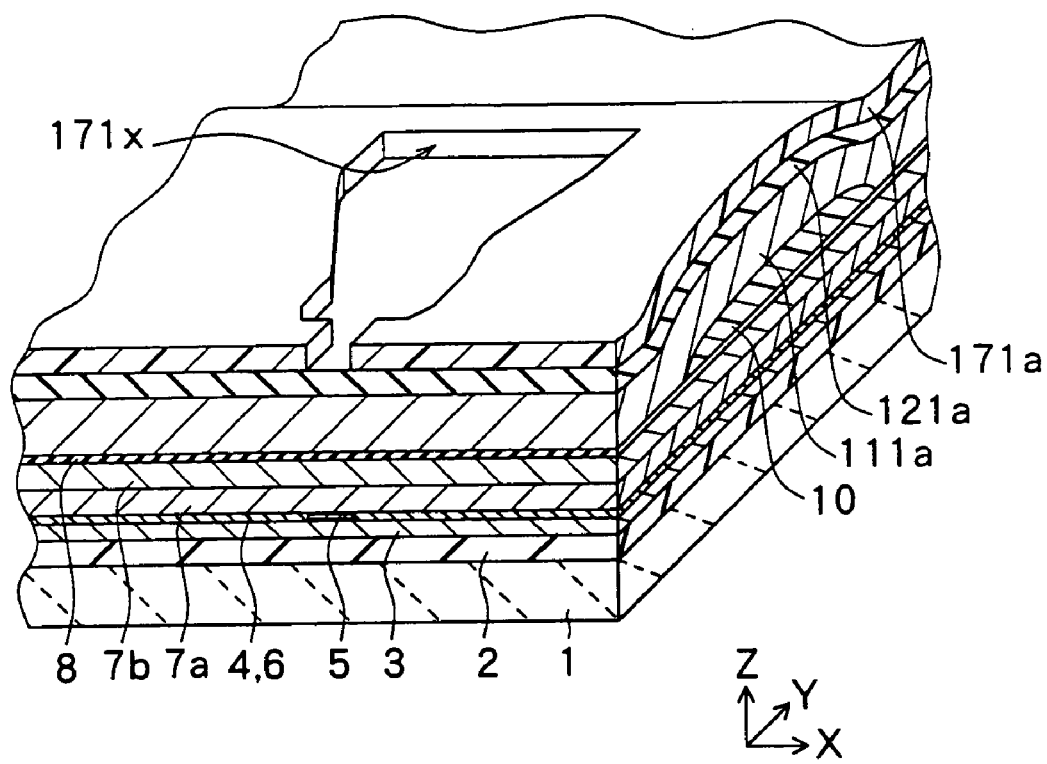
FIG. 16 is a perspective view for describing another variation of the method of forming the top pole tip of the first embodiment of the present invention.
Figure 17:
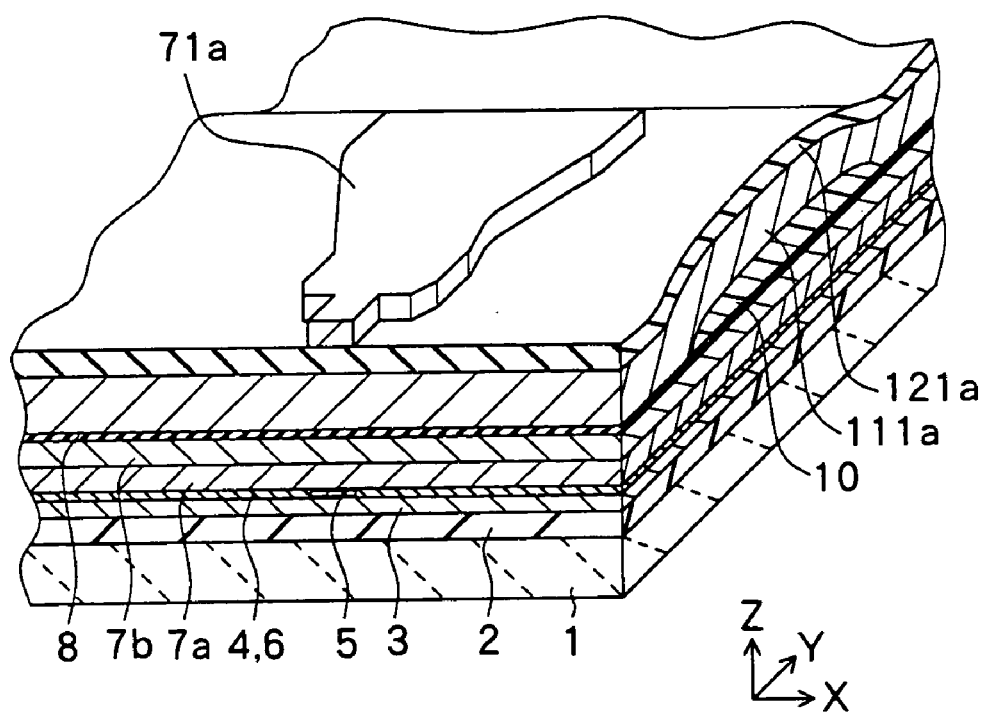
FIG. 17 is a perspective view for describing the step continued from FIG. 16.

FIG. 16 and FIG. 17 are the views for describing a second variation of the present embodiment. In this variation, an electrode film (not shown) used as a seed layer in electrolytic plating is formed of, for example, permalloy in a thickness of about 70 nm by, for example, sputtering on the first mask precursor layer 121a. On this electrode film, a photoresist film is formed in a thickness of, for example, about 1 µm to 2 µm, and selectively patterned through photolithography, to thereby form a photoresist pattern 171a having an opening 171x in a prescribed shape, as shown in FIG. 16. The planar shape of the opening 171x corresponds to that of the top pole tip 11a. If the thickness of the photoresist film is as small as about 1 µm or smaller, adverse effects of light reflected from the electrode film (seed layer) during exposure can be suppressed, contributing to highly precise formation of the opening 171x. Next, a second mask 71a is formed of a plated film by growing, for example, permalloy in the opening 171x by electrolytic plating using the above electrode film as a seed layer as shown in FIG. 17. It should be noted that FIG. 17 shows the state after the photoresist pattern 171a is removed. As the steps following the step of forming the second mask 71a are the same as those in the above-described embodiment, description thereof will be omitted. Even when the subsequent steps are proceeded by using such a second mask 71a, the same effects as those of the above-described embodiment can be obtained. It should be noted that the second mask 71a corresponds to one specific example of the "second mask" as the "metal film pattern" of the invention formed of a plated film.

<Variation 1-3>

Figure 18:
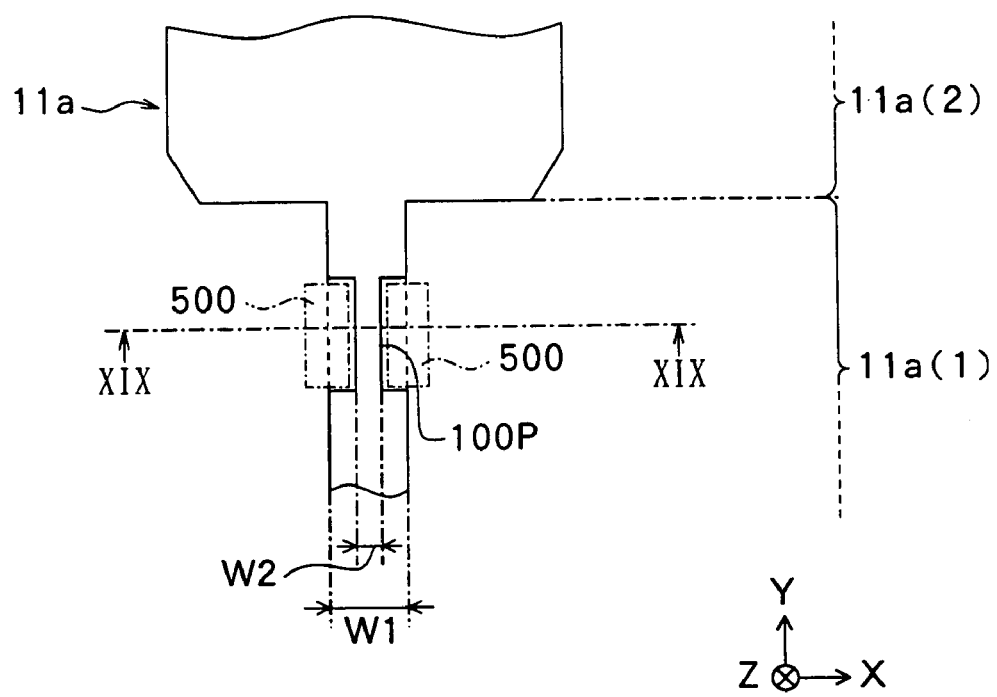
FIG. 18 is an enlarged plan view illustrating the pole and its surrounding area for describing a variation of the method of forming the pole.
Figure 19:
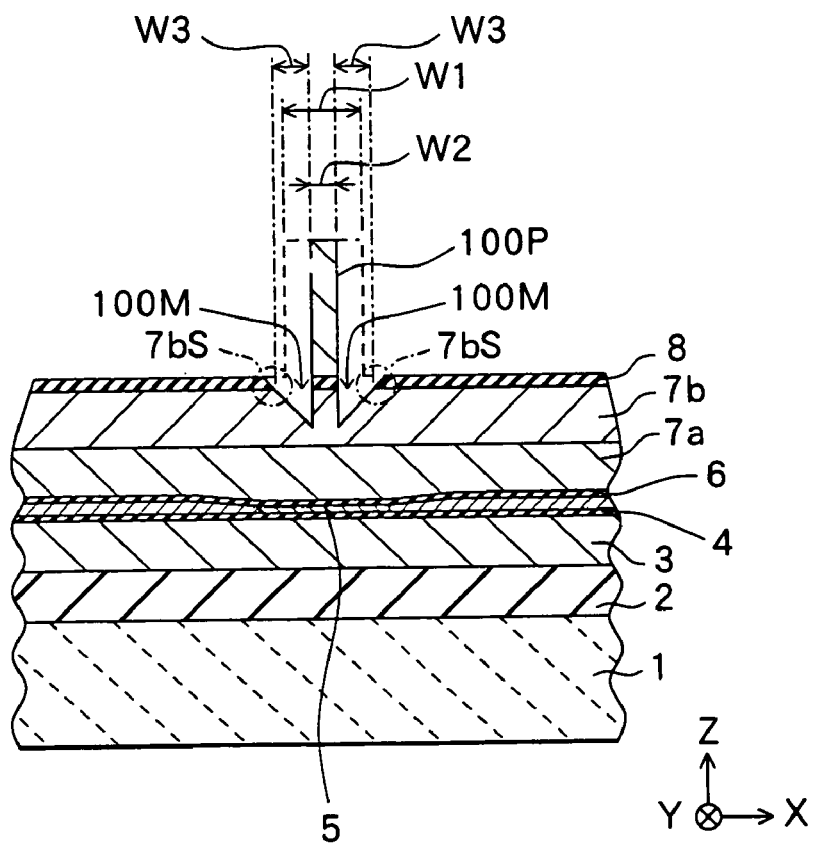
FIG. 19 is a cross sectional view corresponding to the plan view of FIG. 18.
Figure 20:
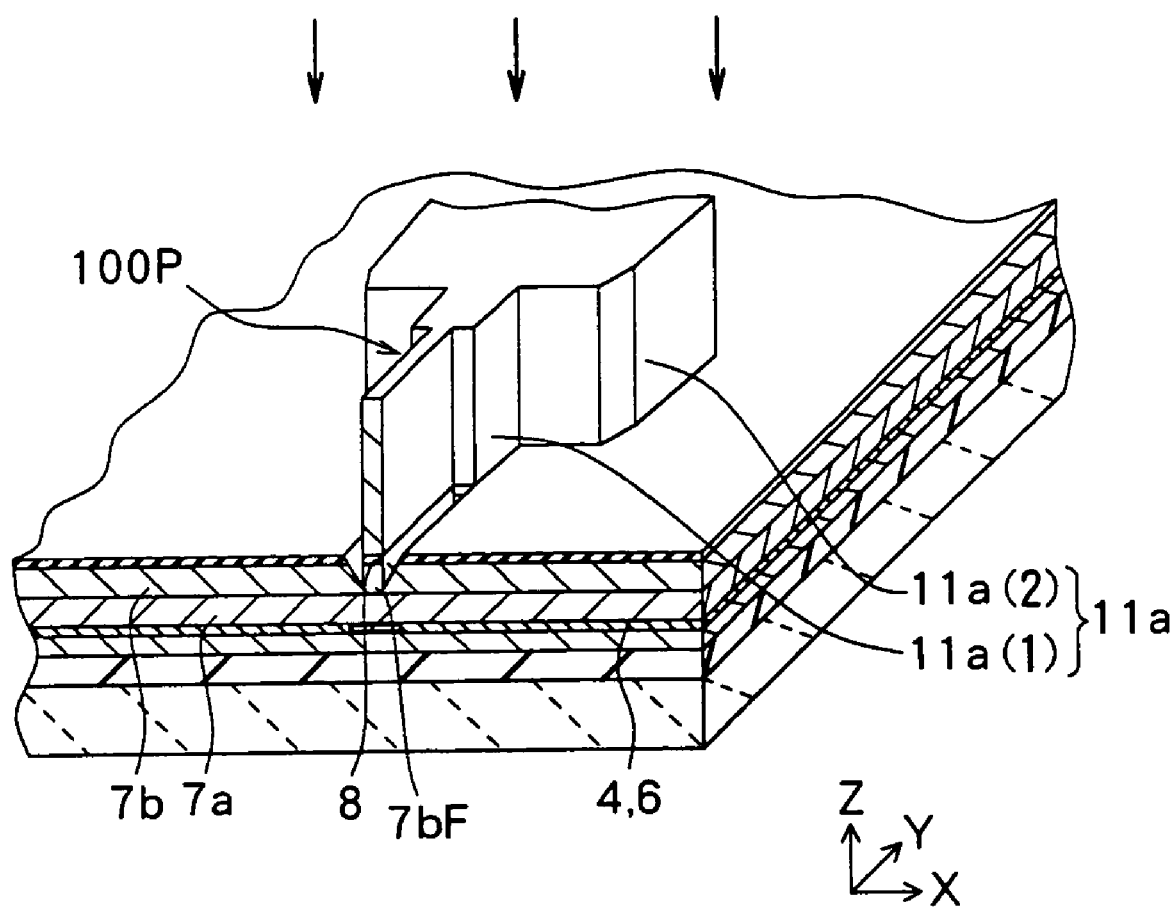
FIG. 20 is a perspective view corresponding to the cross-sectional view of FIG. 19.

While the pole tip 100 is formed only by the etching process with the RIE as shown in FIG. 3B and FIG. 10 in the above embodiment, the pole may be formed by other methods. The smallest possible pole width is limited to about 0.3 µm if the above-described method is employed, and the precision in processing the pole tip 100 will be significantly declined if the pole width is equal to or smaller than 0.3 µm. As a method of achieving the pole width (pole 100P) of equal to or less than 0.3 µm, etching with both RIE and focused ion beam (FIB) is effective, as shown in FIG. 18 to FIG. 20. FIG. 18 is an enlarged view of a planar shape of the pole 100P and surrounding regions in etching. FIG. 19. shows a cross-sectional structure of the pole 100P and the surrounding regions after the etching process. FIG. 20 is an enlarged perspective view of the pole 100P and the surrounding regions after the etching process. Each of these figures shows the step subsequent to the step shown in FIG. 9 in the above embodiment, and the components same as those in FIG. 9 of the above embodiment are indicated by the same reference characters. In addition, description related to the X, Y, and Z axis directions in these figures are the same as those in the above embodiment. FIG. 18 shows only part of the widened portion 11a(2) and the tip portion 11a(1) of the top pole tip 11a, and the rest of the portions are omitted therein. FIG. 19 is a cross sectional view taken along the line XIX—XIX in FIG. 18.

In order to form the pole 100P by the etching process with both RIE and FIB, the top pole tip 11a (the width of the tip portion 11a(1) is represented as W1, where W1 is greater than or equal to 0.3 µm) is first formed by the RIE. Next, as shown in FIG. 18, a region 500 shown in the figure, for example, is etched by the FIB, to thereby remove the portion of the tip portion 11a(1) corresponding to the region 500. Subsequently, the portions of the write gap layer 8 and the second bottom pole 7b corresponding to the region 500 are removed, to thereby form the pole 100P having a trim structure. As shown in FIG. 19, the pole 100P formed by the above etching process has a width W2 smaller than W1 (W2 <0.3 µm), that is, the pole width can be further narrowed. In addition, this width is constant with high precision throughout the thickness direction and the length direction.

The portions of the write gap layer 8 and the second bottom pole 7b corresponding to the region 500 are partially dug deeply, and especially in the second bottom pole 7b, a groove 100M having, for example, a V-shaped cross sectional structure is formed. When the etching process is performed with the FIB, a width W3 of the groove 100M at the outermost surface of the second pole 7b is preferably about 1 µm or greater. This is because the width W3 of the groove 100M equal to or greater than about 1 µm can prevent generation of the side erase in recording due to adverse effects of part (portion 7bS) of the second bottom pole 7b. A three-dimensional structure at this time is shown in FIG. 20. As a result, the pole width is narrowed with high precision, and therefore recording characteristics with higher density and stability can be obtained. When the etching process with both RIE and FIB is employed, it is also possible to first form the pole tip 100 with the pole width W1 through RIE and reduce the width to the pole width W2 through FIB. The step of forming the insulating film 12 and the subsequent steps are the same as those shown in FIGS. 3A and 3B and so on in the above-described embodiment.

Second Embodiment

A second embodiment of the present invention will next be described.

A method of manufacturing a composite thin-film magnetic head as a method of manufacturing a thin-film magnetic head according to a second embodiment of the invention will be described with reference to FIGS. 21A and 21B to FIGS. 25A and 25B. A thin-film magnetic head according to this embodiment will also be described because it is embodied by the method of manufacturing a thin-film magnetic head of this embodiment. Each of FIG. 21A to FIG. 25A illustrates a cross section perpendicular to the air bearing surface, while each of FIG. 21B to FIG. 25B illustrates a cross section in parallel to the air bearing surface of the pole. The notations related to X, Y, and Z axis directions in FIGS. 21A and 21B to FIGS. 25A and 25B are the same as those in the above-described first embodiment, and the components in these figures identical to those in the first embodiment are indicated by the same reference characters.

Figure 21B:
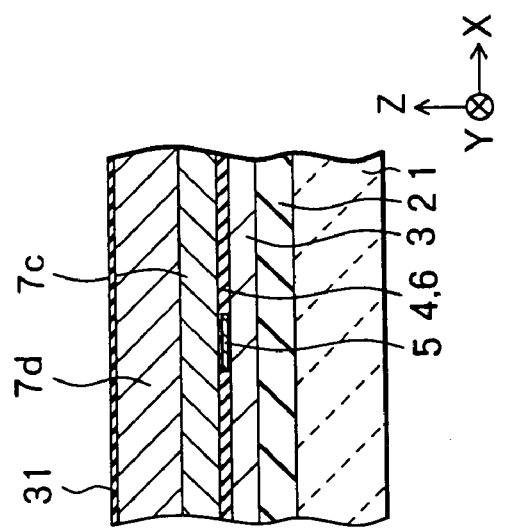
FIGS. 21A and 21B are cross-sectional views for describing one step of a method of manufacturing a thin-film magnetic head of a second embodiment of the present invention.
Figure 21A:
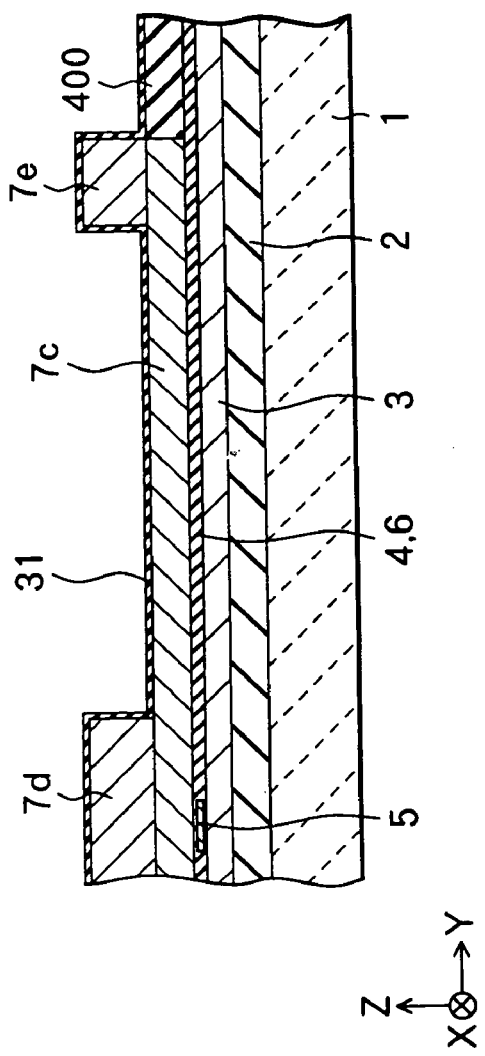

In the method of manufacturing a thin-film magnetic head of the present embodiment, the steps up to the step of burying the MR film 5 in the shield gap films 4 and 6 shown in FIGS. 21A and 21B are the same as those shown in FIGS. 1A and 1B in the first embodiment, description thereof will be omitted.

According to the present embodiment, after the MR film 5 is buried in the shield gap films 4 and 6, a bottom magnetic layer 7c which will be part of the bottom pole 7 is selectively formed in a thickness of about 1 μm to 2 μm in a front region located on the shield gap film 6, as shown in FIGS. 21A and 21B. An insulating film 400 of alumina is formed over the entire surface of the layer structure as mentioned above, the surface of the insulating film 400 is polished by the CMP until the bottom magnetic layer 7c is exposed, and then the entire surface is planarized.

At the same time a bottom pole tip 7d of about 1.5 μm to 2.5 μm in thickness, which will be part of the bottom pole 7, is selectively formed in a front region located on the bottom magnetic layer 7c, a bottom connection portion 7e having the similar thickness, which will also be part of the bottom pole 7, is selectively formed in a rear region located on the bottom magnetic layer 7c.

The bottom magnetic layer 7c, the bottom pole tip 7d and the bottom connection portion 7e above are formed in a manner similar to the top pole tip 11a in the first embodiment. More specifically, a layer of iron nitride deposited by sputtering, for example, is patterned through RIE using a mask of alumina. Such a formation method makes it possible to form the above components constituting the bottom pole 7 with high precision and in a short time. It should be noted that the bottom magnetic layer 7c may also be formed by the electrolytic plating using, for example, permalloy. In forming the bottom pole tip 7d, it is preferable that the rearmost end thereof is positioned behind the rearmost end of the MR film 5 (MRH0 position) by about 1 μm to 3 μm. In forming the bottom connection portion 7e, it is preferable that the rearmost end thereof is in line with that of the bottom magnetic layer 7c. It should be noted that the bottom pole 7 composed of the bottom magnetic layer 7c, the bottom pole tip 7d, and the bottom connection portion 7e corresponds to one specific example of the "second magnetic layer" of the invention.

Next, as shown in FIGS. 21A and 21B, an insulating film 31 of, for example, alumina is formed over the entire surface of the layer structure as mentioned above in a thickness of about 0.5 μm to 1.5 μm.

Figure 22B:
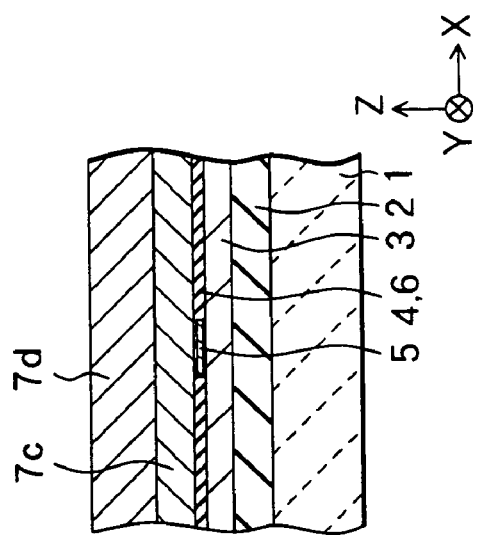
FIGS. 22A and 22B are cross-sectional views for describing the step continued from FIGS. 21A and 21B.
Figure 22A:
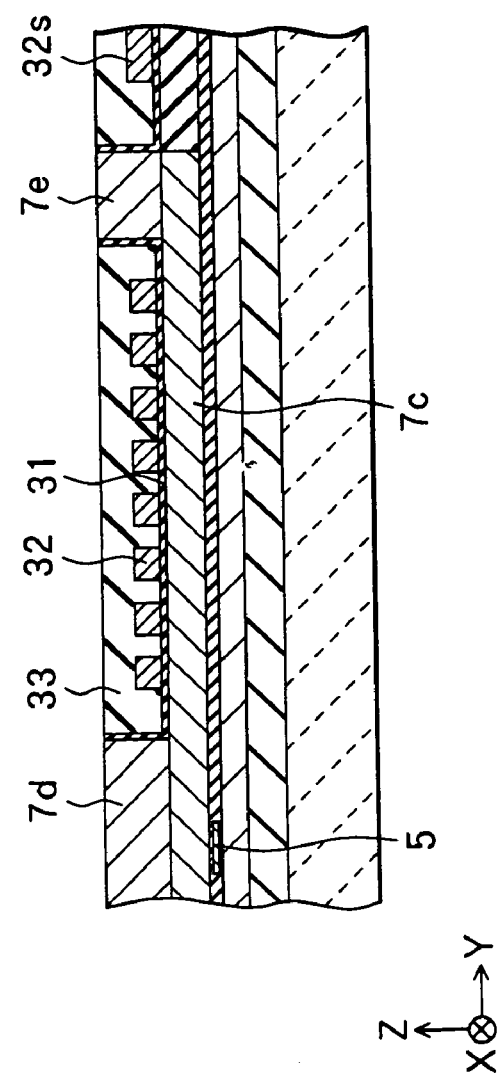

As shown in FIGS. 22A and 22B, a thin-film coil 32 for an inductive-type recording head is formed of, for example, copper (Cu) in a thickness of about 1 μm to 2 μm by, for example, electrolytic plating on a region of the insulating film 31 located between the bottom pole tip 7d and the bottom connection portion 7e. The thin-film coil 32 has the structural features, for example, similar to those of the thin-film coil 13 in the above first embodiment. At the same time the thin-film coil 32 is formed, a coil connection portion 32s is integrally formed with the thin-film coil 32 at, for example, an inner end thereof located on the insulating film 31.

As shown in FIGS. 22A and 22B, an insulating film 33 of, for example, alumina is formed in a thickness of about 3 μm to 4 μm over the entire surface of the layer structure as mentioned above, which is then polished by, for example, the CMP until the bottom pole tip 7d and the bottom connection portion 7e are exposed.

Figure 23A:
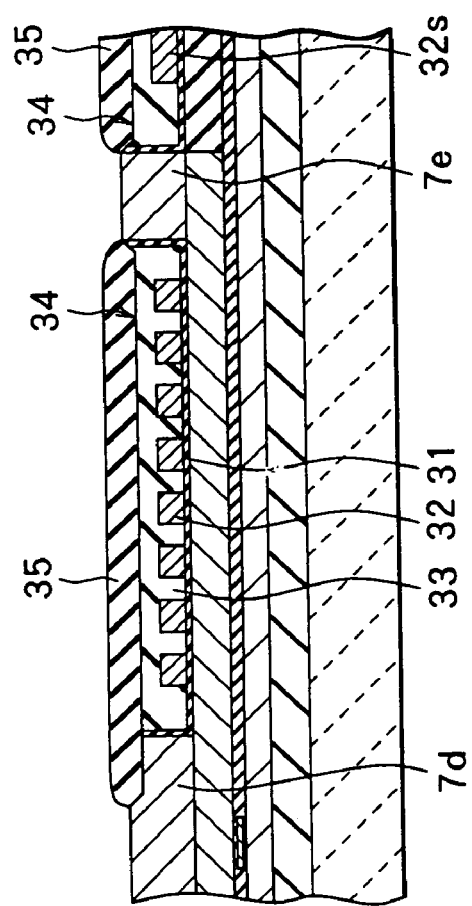
FIGS. 23A and 23B are cross-sectional views for describing the step continued from FIGS. 22A and 22B.
Figure 23B:
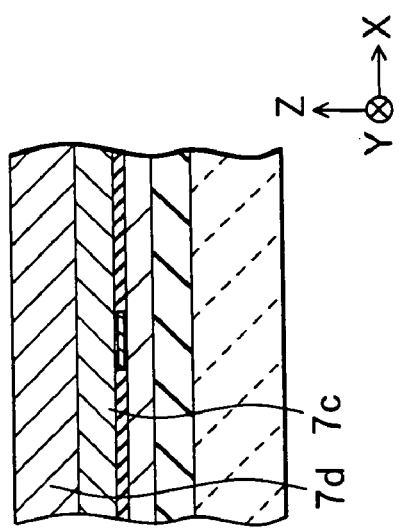

As shown in FIGS. 23A and 23B, the insulating film 33 is etched by about 0.3 μm to 1.2 μm through, for example, RIE or ion milling, and simultaneously part of a rear region of the bottom pole tip 7d is also etched by a similar amount, to thereby form a concave portion 34. At this time, the thin-film coil 32 and the coil connection portion 32s may be, or may not be, exposed at the surface of the concave portion 34. In forming the concave portion 34, a side wall of at least its front edge portion is formed as a slope. On the concave portion 34, for example, alumina is formed and patterned through, for example, ion milling, to thereby selectively form an insulating film pattern 35 of about 0.5 μm to 2 μm in thickness. The insulating film pattern 35 has a thickness greater than the depth of the concave portion 34, and the front edge formed as a slope. As a result, the edge and the surrounding region of the insulating film pattern 35 are tapered. The insulating film pattern 35 defines the throat height zero position (TH0 position) and the apex angle (θ).

As shown in FIGS. 24A and 24B, a write gap layer 36 of about 0.15 μm to 0.3 μm in thickness is formed of, for example, alumina over the entire surface of the layer structure as mentioned above. At this time, an opening 36b is formed in the write gap layer 36 for connecting the bottom pole 7 and a top pole 61 to be formed in a later step. The write gap layer 36 corresponds to one specific example of the "gap layer" of the invention.

As shown in FIGS. 24A and 24B, the insulating layer 33, the insulating film pattern 35, and the write gap layer 36 covering the coil connection portion 32s are partially etched through, for example, RIE or ion milling, to thereby form an opening 35k for connecting the coil connection portion 32s and a coil connection wiring 61h to be formed in a later step.

Figure 26:
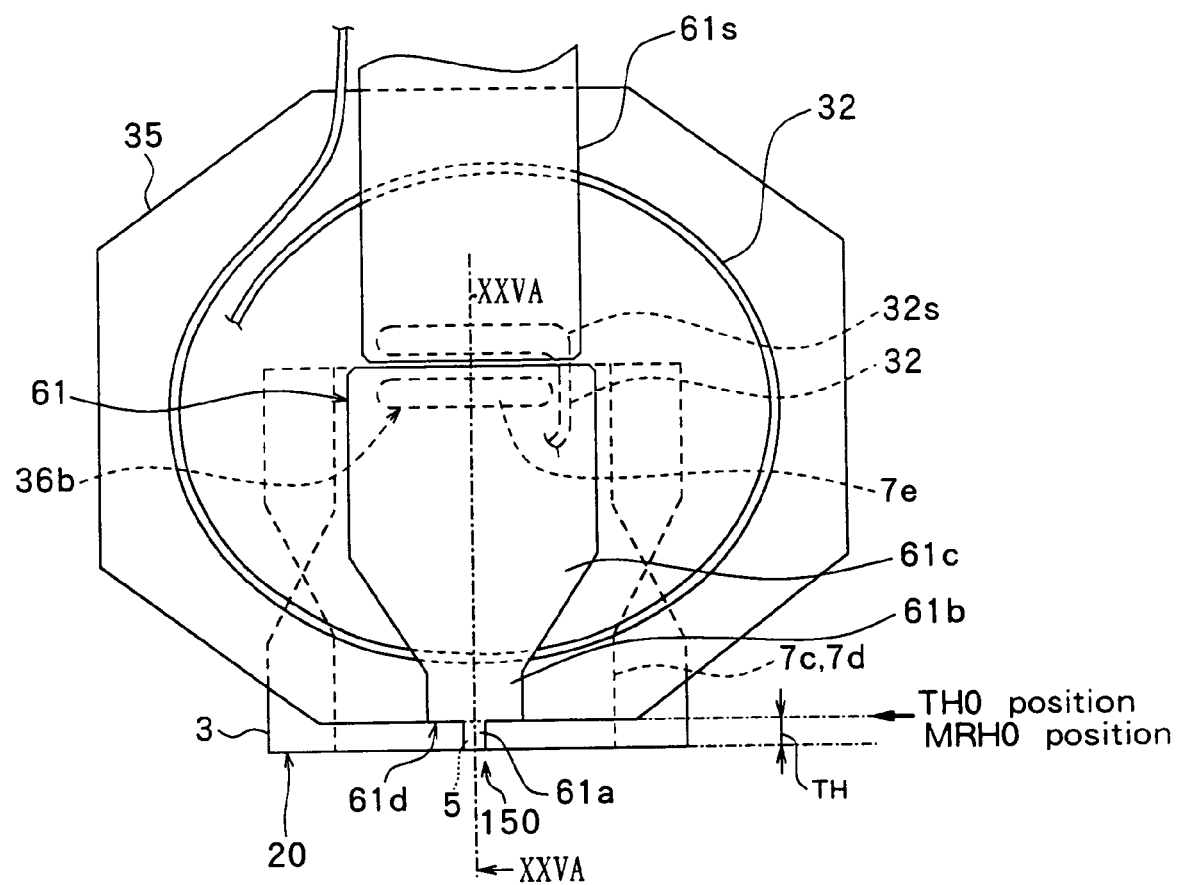
FIG. 26 is a plan view illustrating a planar structure of the thin-film magnetic head of the second embodiment of the present invention.
Figure 27:
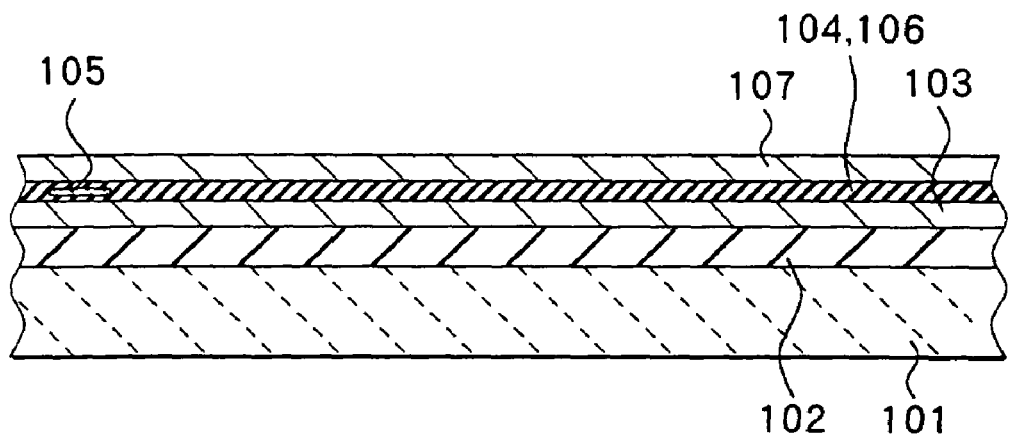
FIG. 27 is a cross-sectional view for describing one step of a method of manufacturing a thin-film magnetic head of a related art.
Figure 28:
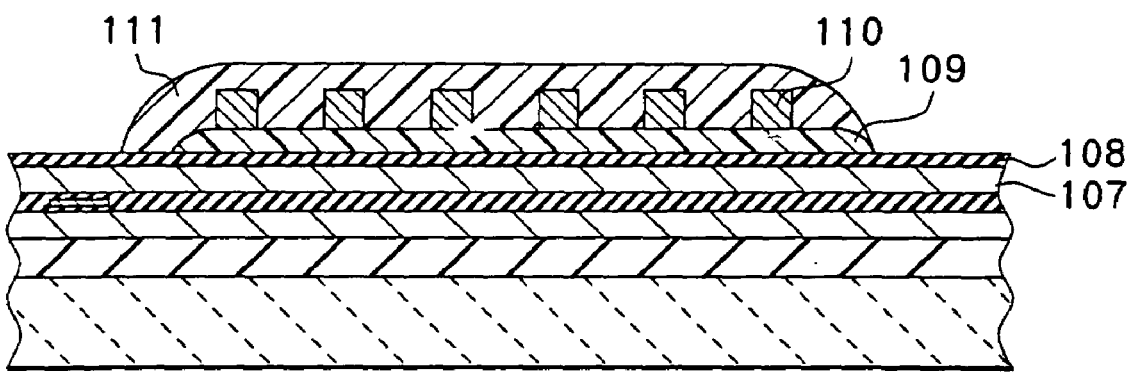
FIG. 28 is a cross-sectional view for describing the step continued form FIG. 27.
Figure 29:
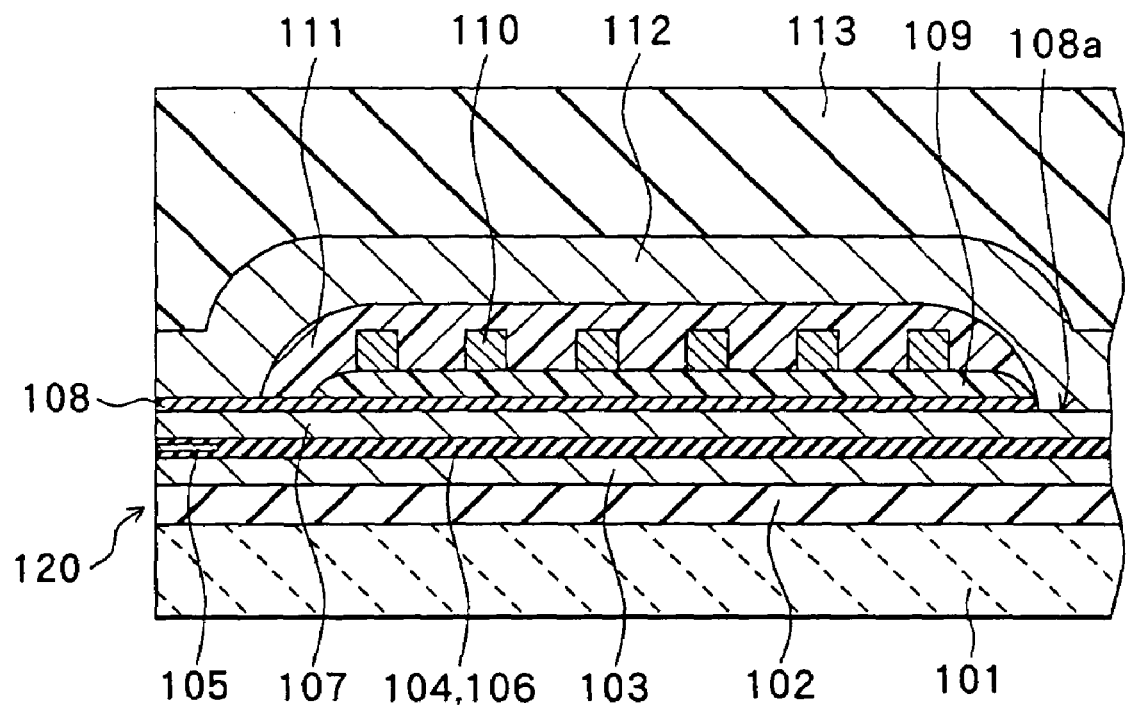
FIG. 29 is a cross-sectional view for describing the step continued from FIG. 28.
Figure 30:
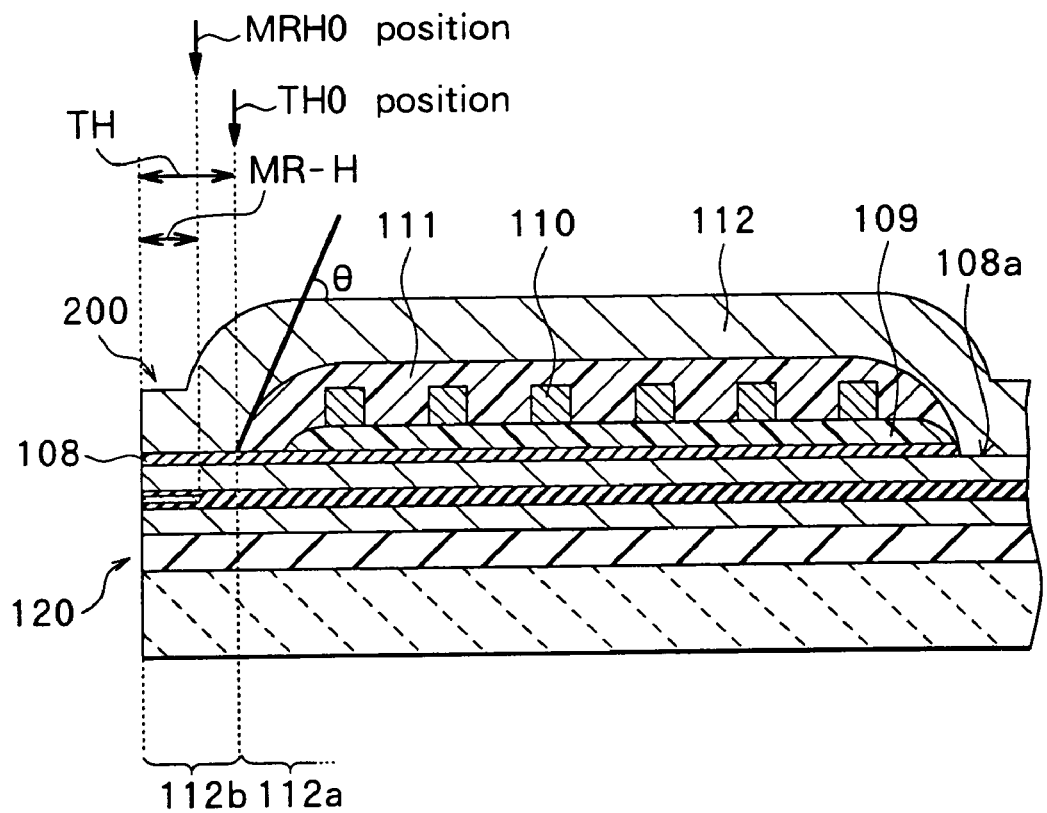
FIG. 30 is a cross-sectional view illustrating the structure of an important part of the thin-film magnetic head of the related art.
Figure 31:
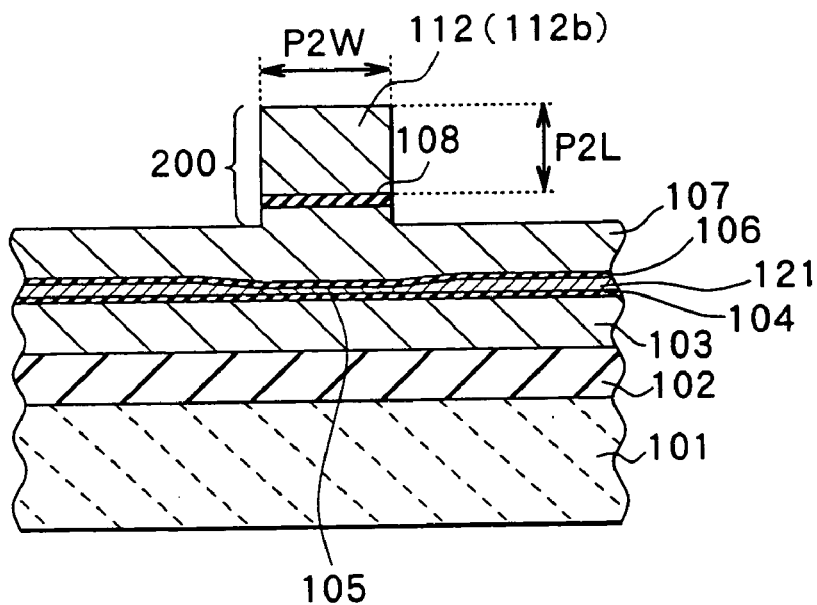
FIG. 31 is a view illustrating a cross section, in parallel to the air bearing surface, of the pole in the thin-film magnetic head shown in FIG. 30.
Figure 32:
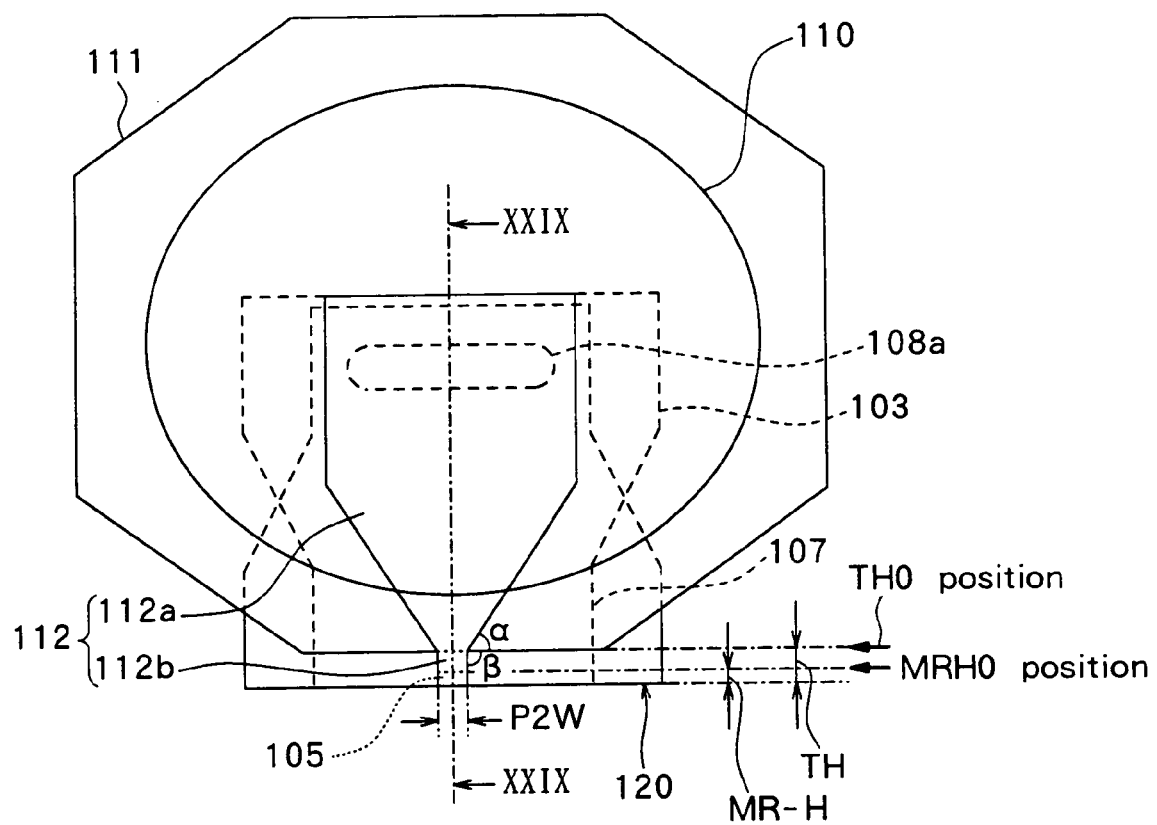
FIG. 32 is a plan view illustrating the structure of the thin-film magnetic head of the related art.
Figure 33:
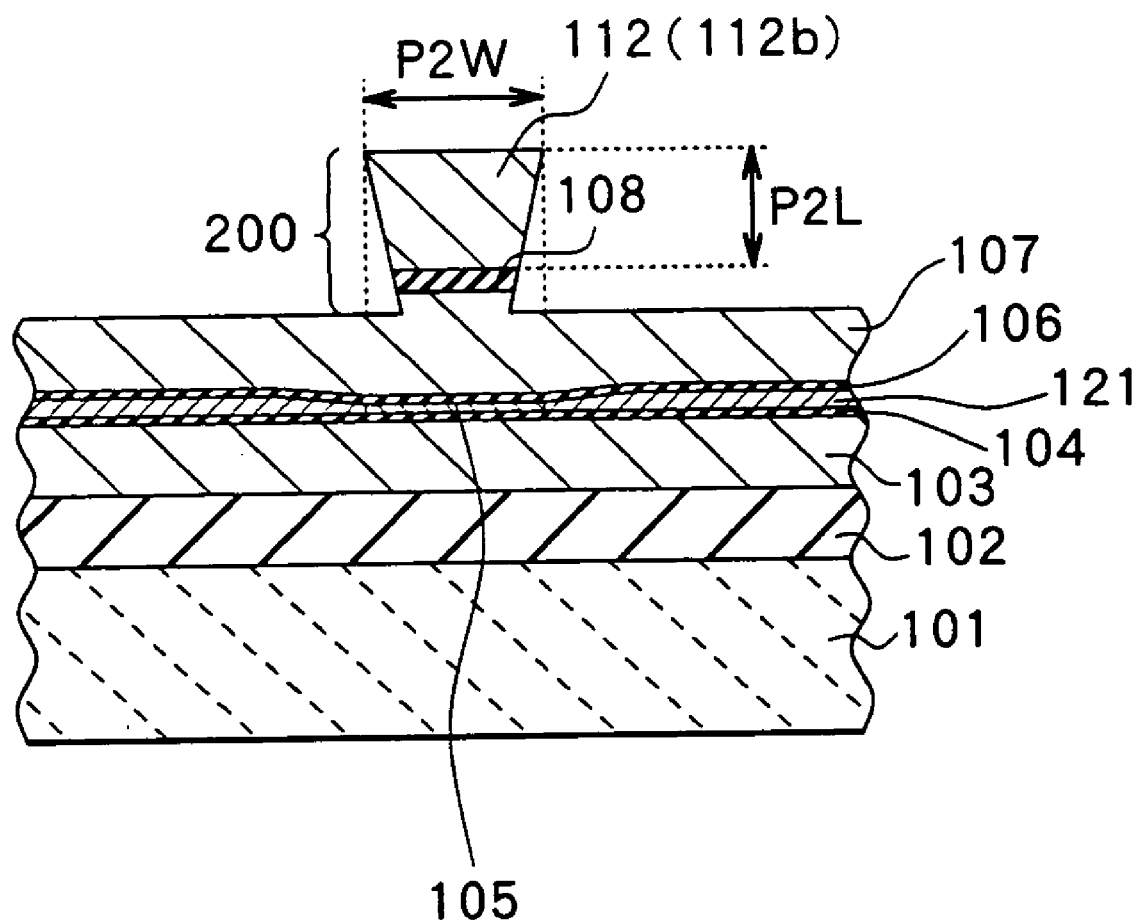
FIG. 33 is a view illustrating a cross section of the pole in parallel to the air bearing surface for describing problems in forming the pole of the thin-film magnetic head of the related art.

As shown in FIGS. 24A and 24B, the top pole 61 of about 1.5 μm to 3 μm in thickness is selectively formed in a region extending from the area located on the bottom connection portion 7e over the position where the air bearing surface 20 is formed in a later step. At the same time the top pole 61 is formed, the coil connection wiring 61h is selectively formed in a region extending from the area located on the opening 35k to the rearward area. The top pole 61 and the coil connection wiring 61h are formed in a similar manner to the top pole tip 11a described in connection with the first embodiment. More specifically, after an iron nitride layer is formed over the entire surface of the layer structure as mentioned above by sputtering, masks 91 and 92 having a shape corresponding to the planar shapes of the top pole 61 and the coil connection wiring 61h, respectively, are disposed at predetermined positions on the surface of the iron nitride layer, and the iron nitride layer is patterned through RIE under a predetermined condition. Such a method enables formation of the top pole 61 and the coil connection wiring 61h with high precision and in a short time. The masks 91 and 92 used for forming these regions may remain after such formation, or may be removed by etching. The top pole 61 has a planar shape, for example, as shown in FIG. 26, which will be described hereinafter, and has a tip portion 61a defining a recording track width on the recording medium, an intermediate portion 61b having a width greater than the tip portion 61a, and a yoke portion 61c having greater width and area than the intermediate portion 61b. The structural features of the top pole 61 will be described hereinafter in detail. The tip portion 61a and the intermediate portion 61b correspond to one specific example of the "first magnetic layer portion" of the invention, and the yoke portion 61c corresponds to one specific example of the "second magnetic layer portion" of the invention. The top pole 61 corresponds to one specific example of the "first magnetic layer" of the invention.

As shown in FIG. 25B, the write gap layer 36 and the bottom pole tip 7d are etched by approximately 0.5 μm through dry etching with RIE, similarly to the case where the top pole tip 100 is formed in the above first embodiment, to thereby form a pole 150 having a trim structure. Such an etching process with RIE makes it possible to form the pole 150 with higher precision and in a shorter time than other methods, such as ion milling. This etching process is performed by using as a mask a photoresist film (not shown) selectively formed in a region of the top pole 61 excluding the region corresponding to the tip portion 61a. The pole 150 is composed of the tip portion 61a of the top pole 61, a portion (7dF) of the bottom pole tip 7d corresponding to the tip portion 61a, and part of the write gap layer 36 sandwiched by the above portions, and these components have substantially the same width. The tip portion 61a corresponds to one specific example of the "first uniform width portion" of the invention, and the portion 7dF corresponds to one specific example of the "second uniform width portion" of the invention.

As shown in FIG. 25A, an overcoat layer 80 of, for example, alumina is formed over the entire surface of the layer structure as mentioned above, and the air bearing surface 20 is formed by machining or polishing, whereby the thin-film magnetic head according to the present embodiment is completed.

FIG. 26 schematically shows a planar structure of the thin-film magnetic head formed by the method of manufacturing a thin-film magnetic head according to the present embodiment. In FIG. 26, the components identical to those in FIG. 12 of the first embodiment are labeled with the same reference characters. In FIG. 26, the insulating film 33, the masks 91 and 92, the overcoat layer 80, and the like are omitted. The thin-film coil 32 is indicated only by its outer periphery portion, and the insulating film pattern 35 is indicated only by its outermost end. FIG. 25A is a cross sectional view taken along the line XXVA—XXVA in FIG. 26.

As shown in FIG. 26, the foremost end of the insulating film pattern 35, i.e. the throat height zero position (TH0 position) is substantially in line with the rearmost end of the MR film 5, i.e. the MRH0 position. However, the positional relationship is not limited to the above example, and the TH0 position may be, for example, behind the MRH0 position.

The top pole 61 includes the tip portion 61a, the intermediate portion 61b and the yoke portion 61c, in the order approaching the air bearing surface 20, which are formed as an integral body. The tip portion 61a is the portion defining a recording track width on the recording medium in recording. In other words, the width of the tip portion 61a defines the track width. The intermediate portion 61b has a width greater than the tip portion 61a, and the yoke portion 61c has a width greater than the intermediate portion 61b. The yoke portion 61c has a structure substantially similar to that of the yoke portion 11c(1) of the top yoke 11c in the first embodiment. At a portion where the tip portion 61a and the intermediate portion 61b are coupled, a step is created in the width direction. The position of a step surface 61d in the step on the side of the intermediate portion 61b is substantially in line with the TH0 position (or the MRH0 position). However, such position is only an example, and the step surface 61d may be in front of, or behind, the TH0 position (or the MRH0 position).

As shown in FIG. 25A and FIG. 26, part of the rear region of the top pole 61 is magnetically coupled sandwiching the bottom connection portion 7e to the bottom magnetic layer 7c and the bottom pole tip 7d in the opening 36b. Therefore, the top pole 61 and the bottom pole 7 (the bottom magnetic layer 7c, the bottom pole tip 7d, and the bottom connection portion 7e) are connected, to thereby form a magnetic path.

The structural features of the components shown in FIG. 26 other than those described above are the same as those of the first embodiment (FIG. 12).

According to the present embodiment, the respective components (the tip portion 61a, the intermediate portion 61b, and the yoke portion 61c) of the top pole 61 are integrally formed, and therefore the manufacturing process can be simplified as compared to the first embodiment where the respective portions (the top pole tip 11a and the top yoke 11c) of the top pole 11 are formed separately.

According to the present embodiment, the insulating film pattern 35 of alumina for defining the throat height (TH) and the apex angle (θ) is formed to part of its lower portion be buried in the convex portion 34. As a result, the apex angle (θ) can be reduced as compared to the case where the insulating film pattern 35 is formed directly on the polished and planarized surface without the convex portion 34 provided. As the edge and its surrounding region of the insulating film pattern 35 are tapered, such a shape also contributes to reduction in the apex angle (θ), and to a smoother flow of magnetic flux over the tapered portion, especially.

Since the insulating film pattern 35 having a sufficient thickness is formed over the thin-film coil 32 in the present embodiment, insulation between the thin-film coil 32 and the top pole 61 can be ensured.

Functions, effects, and variations of the method of manufacturing a thin-film magnetic head of the present embodiment other than those described above are the same as those in the first embodiment, and therefore description thereof will be omitted.

While the insulating film pattern 35 is formed of alumina in this embodiment, the material is not limited thereto, and photoresist, or SOG, for example, may be used. If such a material is used, heat treatment is applied to the formed photoresist film or SOG film at a temperature of, for example, 200° C. to 250° C. to fluidize photoresist or SOG, so that the front edge portion of the film has a tapered shape.

Although polishing the surface of the insulating film 33 is stopped when the bottom pole tip 7d and the connection portion 7e are exposed in this embodiment, it is not limited thereto, and polishing may continue until the thin-film coil 32, as well as the above parts, are exposed. In such a case, it is preferable that the insulating pattern 35 is formed on the polished and planarized surface without forming the concave portion 34, so as to avoid loss in film thickness of the thin-film coil 32 caused by etching the thin-film coil 32 in forming the concave portion 34.

While the pole 150 is formed through RIE in this embodiment, the formation method is not limited thereto, and both the RIE and FIB may be employed as described in connection with the variations 1–3 of the first embodiment.

While the present invention has been described in the context of the preferred embodiments thereof, the invention is not limited to these embodiments but can be varied in numerous ways. For example, it is recommended in the above description of the embodiments that the respective magnetic layer portions constituting the thin-film magnetic head are formed by selectively etching the iron nitride layer through RIE in order to enhance formation precision and speed. However, such a formation method need not be employed to all the magnetic layer portions. For instance, part of the respective magnetic layer portions may be formed of permalloy or the like by electrolytic plating. It should be noted, however, that at least the portion requiring high precision in formation, i.e. the portion constituting the pole (the top pole tip 11a and the second bottom pole 7b in the first embodiment, and the top pole 61 and the bottom pole tip 7d in the second embodiment) are preferably formed by selectively etching iron nitride through RIE.

Further, the planar shapes of the top pole tip 11a and the top yoke 11c are not limited to those shown in FIG. 12, and can be modified as desired as long as the requirement of fully supplying the magnetic flux generated by the thin-film coil 13 to the very tip of the tip portion 11a(1). Similarly, the planar shape of the top pole 61 may also be modified.

Further, while the method of manufacturing a composite thin-film magnetic head is described in connection with the above embodiments and variations, the present invention may also be applied to a thin-film magnetic head for recording use only having an inductive-type magnetic transducer for writing, and to a thin-film magnetic head for both recording and reproduction having an inductive-type magnetic transducer. The present invention may also be applied to a thin-film magnetic head having a structure where the order of stacking the elements for writing and reading are reversed.

As described above, according to the method of manufacturing a thin-film magnetic head of the invention, at least one of the step of forming the first magnetic layer and the step of forming the second magnetic layer includes the steps of forming a magnetic material layer and selectively etching the magnetic material layer by reactive ion etching. As a result, the time required for etching is reduced as compared to the case where the magnetic material layer is processed through ion milling. Consequently, the time required for manufacturing the entire thin-film magnetic head can be significantly reduced.

According to the method of manufacturing a thin-film magnetic head of one aspect of the invention, the first mask is formed of a material including aluminum oxide or aluminum nitride. As a result, a loss in thickness of the first magnetic layer portion can be reduced as compared to the case where a material with a high etching rate, such as photoresist film, is used for forming the first mask.

According to the method of manufacturing a thin-film magnetic head of another aspect of the invention, as the first mask is formed by reactive ion etching, the time required for forming the first mask can be reduced.

According to the method of manufacturing a thin-film magnetic head of still another aspect of the invention, formation of the first uniform width portion of the first magnetic layer, selective removal of the gap layer excluding the portion corresponding to the first uniform width portion, and formation of the second uniform width portion of the second magnetic layer are successively formed. As a result, the time required for manufacturing the entire thin-film magnetic head can be reduced.

According to the method of manufacturing a thin-film magnetic head of still another aspect of the invention, the third magnetic layer is formed by reactive ion etching. As a result, the third magnetic layer can be formed with high precision and in a short time, to thereby achieve further reduction in time for manufacturing the entire thin-film magnetic head.

According to the method of manufacturing a thin-film magnetic head of still another aspect of the invention, a material containing iron nitride, or a material containing zirconium-cobalt-iron (amorphous alloy) is used as a material of the magnetic material layer. As a result, reattachment can be reduced in etching the magnetic material layer through RIE as compared to the case where permalloy or the like is used, to thereby achieve a high precision patterning.

According to the method of manufacturing a thin-film magnetic head of still another aspect of the invention, the processing step is performed at a temperature in a range of 50° C. to 300° C., and therefore the time required for etching can be reduced.

According to the method of manufacturing a thin-film magnetic head of still another aspect of the invention, after a first etching step with reactive ion etching, a second etching step with focused ion beam etching is performed, to thereby achieve formation of the first uniform width portion of the first magnetic layer, selective removal of the region of the gap layer excluding the portion corresponding to the first uniform width portion, and formation of the second uniform width portion of the second magnetic layer. As a result, the width of the unetched portion (masked portion) can be made narrower with a higher precision than the width achieved only by the reactive ion etching process.

According to the method of manufacturing a thin-film magnetic head of still another aspect of the invention, the groove is formed having at least 1 μm in width, to thereby prevent generation of side erase during recording.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head, the head comprising:

first and second magnetic layers each including a magnetic pole and magnetically coupled to each other, the magnetic poles facing each other with a gap layer in between and positioned to face toward a recording medium; and a thin-film coil portion disposed between the two magnetic layers with an insulating film in between; the first magnetic layer including a first magnetic layer portion having a first uniform width portion that defines a track width, and a second magnetic layer portion extending over a region where the thin-film coil portion is disposed and magnetically coupled to the first magnetic layer portion, the second magnetic layer including a second uniform width portion formed in a similar position and opposite to the first uniform width portion of the first magnetic layer, the method comprising:

a first step of forming the first magnetic material layer on the gap layer made of aluminum oxide, and patterning the first magnetic material layer through the use of a first mask made of aluminum oxide by reactive ion etching so as to form at least the first uniform width portion of the first magnetic layer;

a second step of selectively removing a region of the gap layer excluding a portion that includes to the first uniform width portion of the first magnetic layer by reactive ion etching; and a third step of patterning a second magnetic material layer by reactive ion etching so as to form at least the second uniform width portion of the second magnetic layer, wherein in the first, second, and third steps, the reactive ion etching is performed in a chlorine gas atmosphere at a temperature ranging from 150° C. to 250 ° C.

2. A method of manufacturing a thin-film magnetic head according to claim 1, wherein the step of forming the first mask including the steps of:

forming a mask precursor layer made of the inorganic material on a surface of the first magnetic material layer;

forming a second mask on a surface of the mask precursor layer; and patterning the mask precursor layer with use of the second mask.

3. A method of manufacturing a thin-film magnetic head according to claim 2, wherein the first mask is formed by reactive ion etching.

4. A method of manufacturing a thin-film magnetic head according to claim 2, wherein a photoresist film pattern having a predetermined shape is formed on the surface of the mask precursor layer, and used as the second mask.

5. A method of manufacturing a thin-film magnetic head according to claim 2, wherein a metal film pattern having a predetermined shape is formed on the surface of the mask precursor layer, and used as the second mask.

6. A method of manufacturing a thin-film magnetic head according to claim 5, wherein the metal film pattern is formed by selectively plating the surface of the mask precursor layer.

7. A method of manufacturing a thin-film magnetic head according to claim 5, wherein the metal film pattern is formed by forming a metal layer on the surface of the mask precursor layer and selectively etching the metal layer.

8. A method of manufacturing a thin-film magnetic head according to claim 1, wherein in forming the first magnetic layer, the second magnetic layer portion is formed separately from the first magnetic layer portion by reactive ion etching.

9. A method of manufacturing a thin-film magnetic head according to claim 1, wherein the first magnetic material layer is formed by sputtering using a predetermined magnetic material.

10. A method of manufacturing a thin-film magnetic head according to claim 9, wherein the magnetic material contains iron nitride.

11. A method of manufacturing a thin-film magnetic head according to claim 9, wherein the magnetic material contains an amorphous alloy.

12. A method of manufacturing a thin-film magnetic head according to claim 11, wherein the amorphous alloy contains zirconium-cobalt-iron.

13. A method of manufacturing a thin-film magnetic head according to claim 1, wherein the first step is performed using a first mask formed of an inorganic material, and the second and third steps are performed using at least one of the first mask and the first uniform width portion as a mask.

14. A method of manufacturing a thin-film magnetic head according to claim 1 consisting of the first, second, and third steps which are consecutively performed in one process.

* * * * *